United States Patent [19]
Sugiyama

[11] Patent Number: 5,343,864
[45] Date of Patent: Sep. 6, 1994

[54] ULTRASONIC DIAGNOSTIC APPARATUS

[75] Inventor: Yuichi Sugiyama, Kawasaki, Japan

[73] Assignee: Fujitsu Limited, Kawasaki, Japan

[21] Appl. No.: 26,784

[22] Filed: Mar. 5, 1993

[30] Foreign Application Priority Data

Mar. 19, 1992 [JP] Japan .................................. 4-063768

[51] Int. Cl.$^5$ ................................................ A61B 8/00
[52] U.S. Cl. ................................ 128/661.01; 73/626
[58] Field of Search ....................... 128/661.01, 661.09; 73/625, 626

[56] References Cited

U.S. PATENT DOCUMENTS

| | | | |
|---|---|---|---|
| 4,926,872 | 5/1990 | Brock-Fisher et al. | 128/661.01 |
| 5,060,652 | 10/1991 | Umemura et al. | 128/661.01 |
| 5,156,153 | 10/1992 | Bonnefous | 128/661.09 |

*Primary Examiner*—William E. Kamm
*Assistant Examiner*—George Manuel
*Attorney, Agent, or Firm*—Staas & Halsey

[57] ABSTRACT

The present invention relates to an improvement of a delay control circuit of an ultrasonic diagnostic apparatus and is intended to provide a circuit configuration capable of utilizing a cyclicity of combination of signal lines, to absorb variations of a delay amount in accordance with a probe frequency by changing over a plurality of input ports corresponding to the frequencies of the probe which are provided for each of partial assemblies (delay control blocks) of delay lines at an input part of each assembly (delay control block), to confine crossings of signal lines within the partial assemblies of delay lines (delay control blocks) and to allow connection between partial assemblies of delay lines (delay control blocks) with a single signal line.

21 Claims, 17 Drawing Sheets

ULTRASONIC DIAGNOSTIC APPARATUS

BACKGROUND OF THE INVENTION

1. Field of the Invention

The present invention relates to an ultrasonic diagnostic apparatus which transmits ultrasonic waves from an ultrasonic probe, which comprises a plurality of ultrasonic transducers arranged in a specified shape, into a subject, receives ultrasonic waves reflected in the subject with a plurality of transducers, enters these ultrasonic waves into a delay control circuit, which respectively applies a corresponding delay time control or a delay time control and a phase control to received signals obtained therefrom and appropriately adds the modification signals to each other, and displays an internal image of the subject in accordance with additive signals outputted from the delay control circuit and more particularly an improvement of the delay control circuit of this ultrasonic diagnostic apparatus.

2. Description of the Related Art

An ultrasonic diagnostic apparatus has conventionally been used, which transmits ultrasonic waves into a subject such as a human body, receives ultrasonic waves which are reflected to return from the internal tissues of the human body, and diagnoses an internal disease of the human body.

FIG. 18 is an outlined configuration of the ultrasonic diagnostic apparatus.

A transmission control circuit 1 generates control signals for emitting ultrasonic pulses which are focused to a position of desired depth in a subject, and these signals are transmitted into desired transmission driver circuits of those transmission driver circuits which form transmission/receiving circuits 3-1~3-n, and the ultrasonic transducers corresponding to the desired transmission driver circuits among n sets of ultrasonic transducers 2-1~2-n, which form a transducer group are driven, thereby transmission ultrasonic pulses are emitted into the subject. Reflected waves of these transmitted pulses from the subject are received with the ultrasonic transducers 2-1~2-n and transmitted to an apodizing circuit group 4 through receiving amplifiers of transmission/receiving circuits 3-1~3-n.

The apodizing circuit group 4 is controlled by a control circuit 5 and only received signals from the desired ultrasonic transducers are set to have an appropriate gain (for example, a receiving gain at each aperture position of a receiving aperture formed by the selected transducers is apodized in the form of the Gaussian curve) and transmitted to the delay control circuit 6. In the delay control circuit 6, the signals are delayed as long as an appropriate duration of time or given the delay time control and the phase control, the received signals are focused, and the output signals from the delay control circuit 6 are logarithmically converted by a log amplifier 7, transmitted to a display 8 and displayed thereon as an image. The present invention relates to an improvement of this delay control circuit 6 as described later in this specification.

For the ultrasonic diagnostic apparatus, a dynamic focusing approach may be used which changes the focus in sequence as the time elapses.

Along with recent diffusion of the ultrasonic diagnostic apparatus, a demand for those apparatuses with a higher resolution has been increasingly raised. To realize such high resolution apparatuses, the aperture has been required to be larger by increasing the number n of transducers; for example, an apparatus with approximately n=128 has been developed. Thus, the use of a large aperture ultrasonic probe for which a great number of transducers 2-1~2-n are arranged has caused a problem that a great number of transmission/receiving circuit channels are required, the circuit patterns become more complicated and the length of signal lines are extended, thus resulting in a cause of functional deterioration and increase of installation area. In addition, higher probe frequencies (representative frequency of ultrasonic waves transmitted and received by ultrasonic transducers 2-1~2-n) such as, for example, 7.5 MHz have come to be used and therefore more compact circuits have been demanded for the ultrasonic diagnostic apparatuses.

SUMMARY OF THE INVENTION

An object of the present invention made in view of the above reasons is to provide an ultrasonic diagnostic apparatus capable of processing various probe frequencies and having a wholly compact delay control circuit featured with less intersections of signal lines, simplified circuit patterns and short length of signal lines.

In an ultrasonic diagnostic apparatus in accordance with the present invention intended to implement the above described object which transmits ultrasonic waves from an ultrasonic probe, which comprises a plurality of ultrasonic transducers arranged in a specified shape, into a subject, obtains a plurality of received signals by receiving ultrasonic waves reflected in the subject with the ultrasonic transducers, enters the received signals into a delay control circuit which applies corresponding delay time control or delay time control and phase control and appropriately adds each other and displays an internal image of the subject in accordance with additive signals outputted from the delay control circuit, the delay control circuit is characterized in that it is provided with (A) a plurality of delay control blocks and a (B) signal changeover block which is provided in a configuration as shown below.

Of the ultrasonic diagnostic apparatus according to the present invention, each of the above described plurality of delay control blocks of a first ultrasonic diagnostic apparatus comprises:

(1) a plurality of sub-delay line circuits which are connected in series each other and formed by a plurality of delay elements which serve to delay received signals only as long as a specified unit delay time and are connected in series to, (2) external input terminals for mutual connection which are connected to the positions of internal input terminals located at the input side terminating positions of a plurality of sub-delay line circuits to be switchable in accordance with a frequency of ultrasonic waves, (3) external output terminals which are connected with internal output terminals located at the output side terminating positions of a sub-delay line circuit of a plurality of sub-delay line circuits which is connected to the final stage, (4) a plurality of external delay tap input terminals into which a plurality of received signals are entered respectively, (5) a plurality of switches which are provided respectively corresponding to the external delay tap input terminals and output the received signals entered from the external delay tap input terminals through those output terminals, which correspond to a frequency of ultrasonic waves, of a plurality of output terminals, and (6) signal transmission channels which connect a plurality of output terminals of the switches and a plurality of sub-delay line circuits so that the received signals which are respectively outputted from the switches are delayed as long as the specified amount of delay in response to the frequency of ultrasonic waves.

The signal changeover block (B) comprises:

(7) a plurality of first matrix switches into which the received signals are entered through respective input terminals and which are individually provided with a plurality of input terminals and a plurality of output terminals, (8) a plurality of second matrix switches each of which is provided with a plurality of input terminals and a plurality of output terminals, (9) signal transmission channels which connect a plurality of output terminals of the first matrix switches and a plurality of input terminals of the second matrix switches so that a plurality of received signals outputted from a plurality of output terminals of the first matrix switches are individually distributed to a plurality of the second matrix switches, and

(10) signal transmission channels which connect a plurality of output terminals of the second matrix switches and a plurality of external delay tap input terminals of the delay control blocks so that a plurality of output terminals of the second matrix switches are respectively connected to a plurality of corresponding external delay tap input terminals of a plurality of delay control blocks.

Instead that each of a plurality of delay control blocks in the first ultrasonic diagnostic apparatus comprises the components (1)∼(6) as described above, a second ultrasonic diagnostic apparatus according to the present invention is provided with a plurality of delay control blocks each of which comprises:

(11) a plurality of sub-delay line circuits which are connected in series to each other and connected in series with a plurality of delay elements which delay the received signals only as long as a specified unit delay time,

(12) external input terminals for mutual connection which are connected with internal input terminals located at the input side terminating positions of the sub-delay line circuits, which are connected to the foremost stage, of a plurality of sub-delay line circuits,

(13) external output terminals which are connected to the internal output terminal positions located at the output side terminating positions of a plurality of sub-delay line circuits to be switchable in accordance with a frequency of ultrasonic waves,

(14) a plurality of external delay tap input terminals into which a plurality of received signals are entered respectively,

(15) a plurality of switches which are respectively provided corresponding to the external delay tap input terminals and output the received signals entered from the external delay tap input terminals through those output terminals, which correspond to a frequency of ultrasonic waves, of a plurality of output terminals, and

(16) signal transmission channels which connect a plurality of output terminals of the switches and a plurality of sub-delay line circuits so that the received signals which are respectively outputted from the switches may be delayed as long as the specified duration of delay time in response to the frequency of ultrasonic waves.

This second ultrasonic diagnostic apparatus is provided with the same signal conversion block (B) as the signal changeover block provided with components (7)∼(10) in the first ultrasonic diagnostic apparatus.

As a preferable mode of the first ultrasonic diagnostic apparatus (hereinafter referred to as the "first embodiment" in the first ultrasonic diagnostic apparatus), each of the delay control blocks is provided, in order from the rear stage side, with a first sub-delay line circuit consisting of 2 m sets of delay elements, a second sub-delay line circuit consisting of m sets of delay elements, a third sub-delay line circuit consisting of m sets of delay elements and a fourth sub-delay line circuit consisting of 2 m sets of delay elements which respectively comprise a plurality of delay elements for delaying the received signals only as long as the same unit delay time tde, as the above described plurality of sub-delay line circuits which are connected in series to each other and each of the delay control blocks is preferably constructed so that the first, second, third and fourth sub-delay line circuits are used as a delay line with m taps which is divided by m for each delay time 6×tde when the frequency of ultrasonic waves is 2.5 MHz, the first, second and third sub-delay line circuits are used as a delay line with m taps which is divided by m for each delay time 4×tde when the frequency of ultrasonic waves is 3.5 MHz, the first and second sub-delay line circuits are used as a delay line with m taps which is divided by m for each delay time 3×tde when the frequency of ultrasonic waves is 5.0 MHz, and the first delay line circuit is used as a delay line with m taps which is divided by m for each delay time 2×tde when the frequency of ultrasonic waves is 7.5 MHz.

As a preferable mode of the second ultrasonic diagnostic apparatus (hereinafter referred to as the "first embodiment" in the second ultrasonic diagnostic apparatus) based on the same concept as in the first ultrasonic diagnostic apparatus, each of the delay control blocks is provided, in order from the front stage side, with a first sub-delay line circuit consisting of 2 m sets of delay elements, a second sub-delay line circuit consisting of m sets of delay elements, a third sub-delay line circuit consisting of m sets of delay elements and a fourth sub-delay line circuit consisting of 2 m sets of delay elements which respectively comprise a plurality of delay elements for delaying the received signals only as long as the same unit delay time tde, as the above described plurality of sub-delay line circuits which are connected in series each other and each of the delay control blocks is preferably constructed so that the first, second, third and fourth sub-delay line circuits are used as a delay line with m taps which is divided by m for each delay time 6×tde when the frequency of ultrasonic waves is 2.5 MHz, the first, second and third sub-delay line circuits are used as a delay line with m taps which is divided by m for each delay time 4×tde when the frequency of ultrasonic waves is 3.5 MHz, the first and second sub-delay line circuits are used as a delay line with m taps which is divided by m for each delay time 3×tde when the frequency of ultrasonic waves is 5.0 MHz, and the first delay line circuit is used as a delay line with m taps which is divided by m for each delay time 2×tde when the frequency of ultrasonic waves is 7.5 MHz.

As a second embodiment of the first ultrasonic diagnostic apparatus, each of the delay control blocks is provided, in order from the rear stage side, with a first sub-delay line circuit consisting of 2 m sets of delay elements, a second sub-delay line circuit consisting of m sets of delay elements and a third sub-delay line circuit consisting of m sets of delay elements, whereby m is a 3's multiple, which respectively comprise a plurality of delay elements for delaying the received signals only as long as the same unit delay time tde, as the above described plurality of sub-delay line circuits which are connected in series each other and each of the delay control blocks is preferably constructed so that the first, second and third sub-delay line circuits are used as a delay line with m taps which is divided by 2m/3 for each delay time 6×tde when the frequency of ultrasonic waves is 2.5 MHz, the first, second and third sub-delay line circuits are used as a delay line with m taps which is divided by m for each delay time 4×tde when the frequency of ultrasonic waves is 3.5 MHz, the first and second sub-delay line circuits are used as a delay line with m taps which is divided by m for each delay time 3×tde when the frequency of ultrasonic waves is 5.0 MHz, and the first sub-delay line circuit is used as a delay line with m taps which is divided by m for each delay time 2×tde when the frequency of ultrasonic waves is 7.5 MHz.

As a second embodiment of the second ultrasonic diagnostic apparatus based on the same concept as the above described ultrasonic diagnostic apparatus, each of the delay control blocks is provided, in order from the front stage side, with a first sub-delay line circuit consisting of 2 m sets of delay elements, a second sub-delay line circuit consisting of m sets of delay elements and a third sub-delay line circuit consisting of m sets of delay elements, whereby m is a 3's multiple, which respectively comprise a plurality of delay elements for delaying the received signals only as long as the same unit delay time tde, as the above described plurality of sub-delay line circuits which are connected in series each other and each of the delay control blocks is preferably constructed so that the first, second and third sub-delay line circuits are used as a delay line with 2m/3 taps which is divided by 2m/3 for each delay time 6×tde when the frequency of ultrasonic waves is 2.5 MHz, the first, second and third sub-delay line circuits are used as a delay line with m taps which is divided by m for each delay time 4×tde when the frequency of ultrasonic waves is 3.5 MHz, the first and second sub-delay line circuits are used as a delay line with m taps which is divided by m for each delay time 3×tde when the frequency of ultrasonic waves is 5.0 MHz, and the first sub-delay line circuit is used as a delay line with m taps which is divided by m for each delay time 2×tde when the frequency of ultrasonic waves is 7.5 MHz.

In the second embodiment of the first and second ultrasonic diagnostic apparatuses, the first sub-delay line circuit consists of a 1-1 sub-delay line circuit and a 1-2 sub-delay line circuit, and the 1-1 sub-delay line circuit, the 1-2 sub-delay line circuit, the second sub-delay line circuit and the third sub-delay line circuit can be composed of m sets of delay elements for the same unit delay time tde whereby m is a 12's multiple (hereinafter referred to as the "third embodiment").

In this third embodiment, the delay control circuit may have, instead of a plurality of above described delay control blocks, a plurality of delay line constructions having 24's integral multiple sets of taps which consists of two delay control blocks provided with the 1-1 sub-delay line circuit, the 1-2 sub-delay line control circuit, the second sub-delay line circuit and the third sub-delay line circuit which respectively comprise m sets of delay elements for the same unit delay time tde, whereby m is an odd multiple of 12 (hereinafter referred to as the "fourth embodiment").

In addition, as a fifth embodiment of the first ultrasonic diagnostic apparatus, each of the delay control blocks is provided, in order from the rear stage side, with a first sub-delay line circuit consisting of sixteen delay elements, a second sub-delay line circuit consisting of eight delay elements, a third sub-delay line circuit consisting of six delay elements and a fourth sub-delay line circuit consisting of two delay elements which respectively comprise a plurality of delay elements which delay the received signals only as long as the same unit delay time tde, as a plurality of sub-delay line circuits which are connected in series to each other, and each of the delay control blocks may be constructed so that the first, second and third sub-delay line circuits are used as a delay line with 5 taps which is divided by 5 for each delay time 6×tde when the frequency of ultrasonic waves is 2.5 MHz, the first, second, third and fourth sub-delay line circuits are used as a delay line with 8 taps which is divided by 8 for each delay time 4×tde when the frequency of ultrasonic waves is 3.5 MHz, the first and second sub-delay line circuits are used as a delay line with 8 taps which is divided by 8 for each delay time 3×tde when the frequency of ultrasonic waves is 5.0 MHz, and the first sub-delay line circuit is used as a delay line with 8 taps which is divided by 8 for each delay time 2×tde when the frequency of ultrasonic waves is 7.5 MHz.

As a fifth embodiment of the second ultrasonic diagnostic apparatus based on the same concept as the above described ultrasonic diagnostic apparatus, each of the delay control blocks is provided, in order from the front stage side, with a first sub-delay line circuit consisting of sixteen delay elements, a second sub-delay line circuit consisting of eight delay elements, a third sub-delay line circuit consisting of six delay elements and a fourth sub-delay line circuit consisting of two delay elements which respectively comprise a plurality of delay elements for delaying the received signals only as long as the same unit delay time tde, as the above described plurality of sub-delay line circuits which are connected in series each other, and each of the delay control blocks may be constructed so that the first, second and third sub-delay line circuits are used as a delay line with five taps which is divided by 5 for each delay time 6×tde when the frequency of ultrasonic waves is 2.5 MHz, the first, second, third and fourth sub-delay line circuits are used as a delay line with eight taps which is divided by 8 for each delay time 4×tde when the frequency of ultrasonic waves is 3.5 MHz, the first and second sub-delay line circuits are used as a delay line with eight taps which is divided by 8 for each delay time 3×tde when the frequency of ultrasonic waves is 5.0 MHz, and the first sub-delay line circuit is used as a delay line with eight taps which is divided by 8 for each delay time 2×tde when the frequency of ultrasonic waves is 7.5 MHz.

The first and second ultrasonic diagnostic apparatuses according to the present invention are respectively provided with a plurality of delay control blocks which individually consist of the components (1)~(6) (or (11)~(16) described above and therefore each delay control block forms a partial assembly of delay lines and a plurality of input ports (output ports) for selecting a flow of signals in accordance with a probe frequency are provided at the input part (output part of the assembly in case of the second ultrasonic diagnostic apparatus) thereby a variation of the delay time which depends on the probe frequency is absorbed by selecting a plurality of these input ports (output ports).

Intersections of the signal lines are limited within the partial assemblies of delay lines (delay control block) and the partial assemblies of delay lines (delay control blocks) are connected to each other with a single signal line.

Since the first and second ultrasonic diagnostic apparatuses according to the present invention are provided with a plurality of delay control blocks which are constructed as described above, a circuit arrangement which enables use of a cyclicity of combinations of signal lines is formed and a signal changeover block which consists of components (7)~(10) described above to distribute the signals by making use of this cyclicity can be provided and therefore a compact delay control circuit with less intersections of the signal lines as a whole can be materialized.

As described above in detail, the ultrasonic diagnostic apparatus is provided with a plurality of delay control blocks and a signal changeover block which have the above described configuration. Therefore the delay control blocks form partial assemblies of delay lines, the intersections of signal lines are limited within the delay control blocks, these delay control blocks are connected to each other with a single signal line, and circuit wiring is provided by making use of a cyclicity which results from combinations of a plurality of delay control blocks, thereby a compact delay control circuit with less intersections of the signal lines as a whole can be materialized.

DESCRIPTION OF THE PREFERRED EMBODIMENTS

Figure 18:
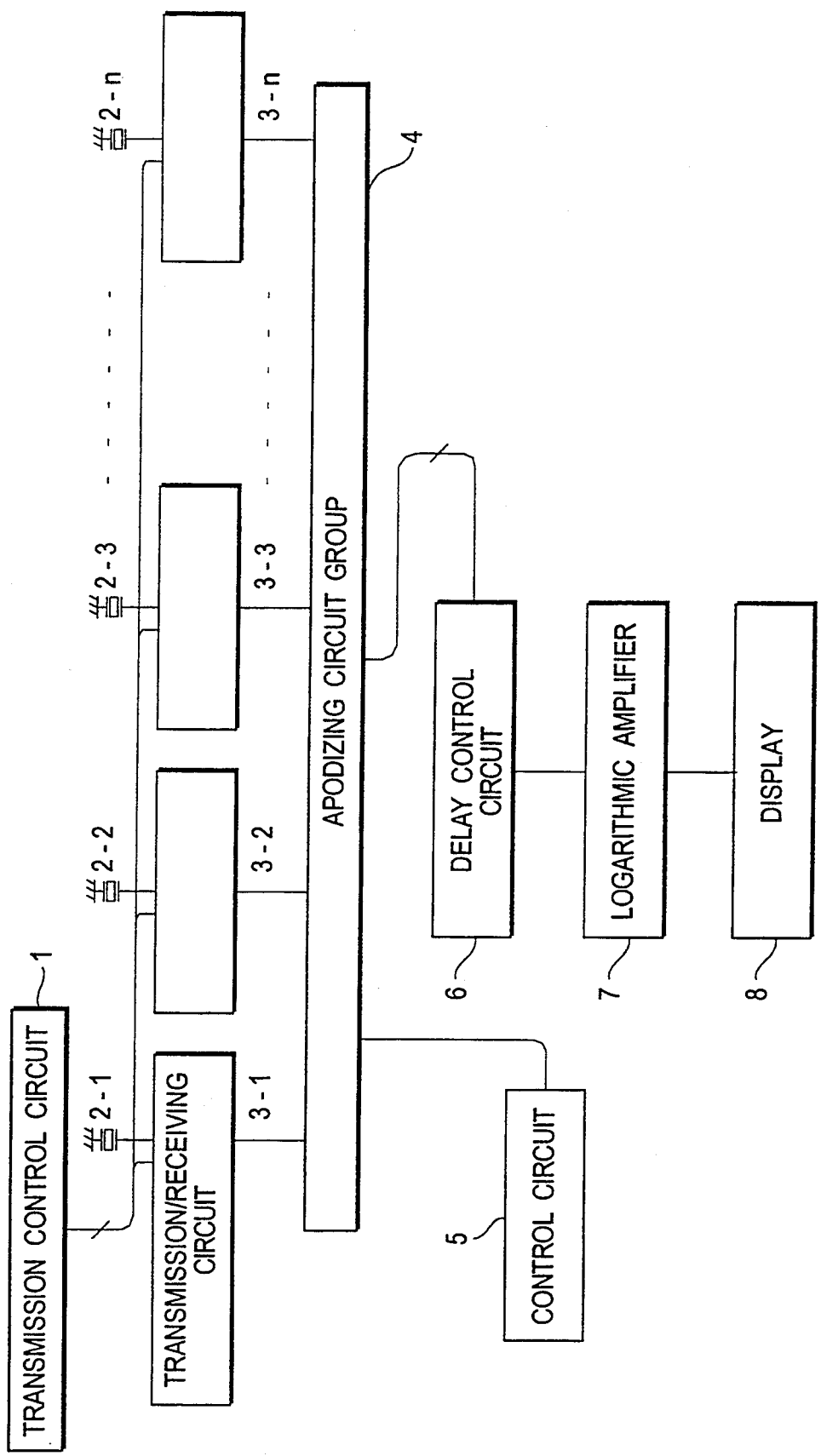
FIG. 18 is a rough configuration of the ultrasonic diagnostic apparatus.

Preferred embodiments of the present invention are described below. The overall configuration of the ultrasonic diagnostic apparatus according to the present invention is the same as the block diagram shown in FIG. 18 and the characteristics of the present invention relate to the internal construction of the delay control circuit 6 shown as a block in FIG. 18 and therefore FIG. 18 and the foregoing description relating to FIG. 18 substitutes for the illustration of the overall configuration and the description of the ultrasonic diagnostic apparatus according to the present invention.

Figure 1:
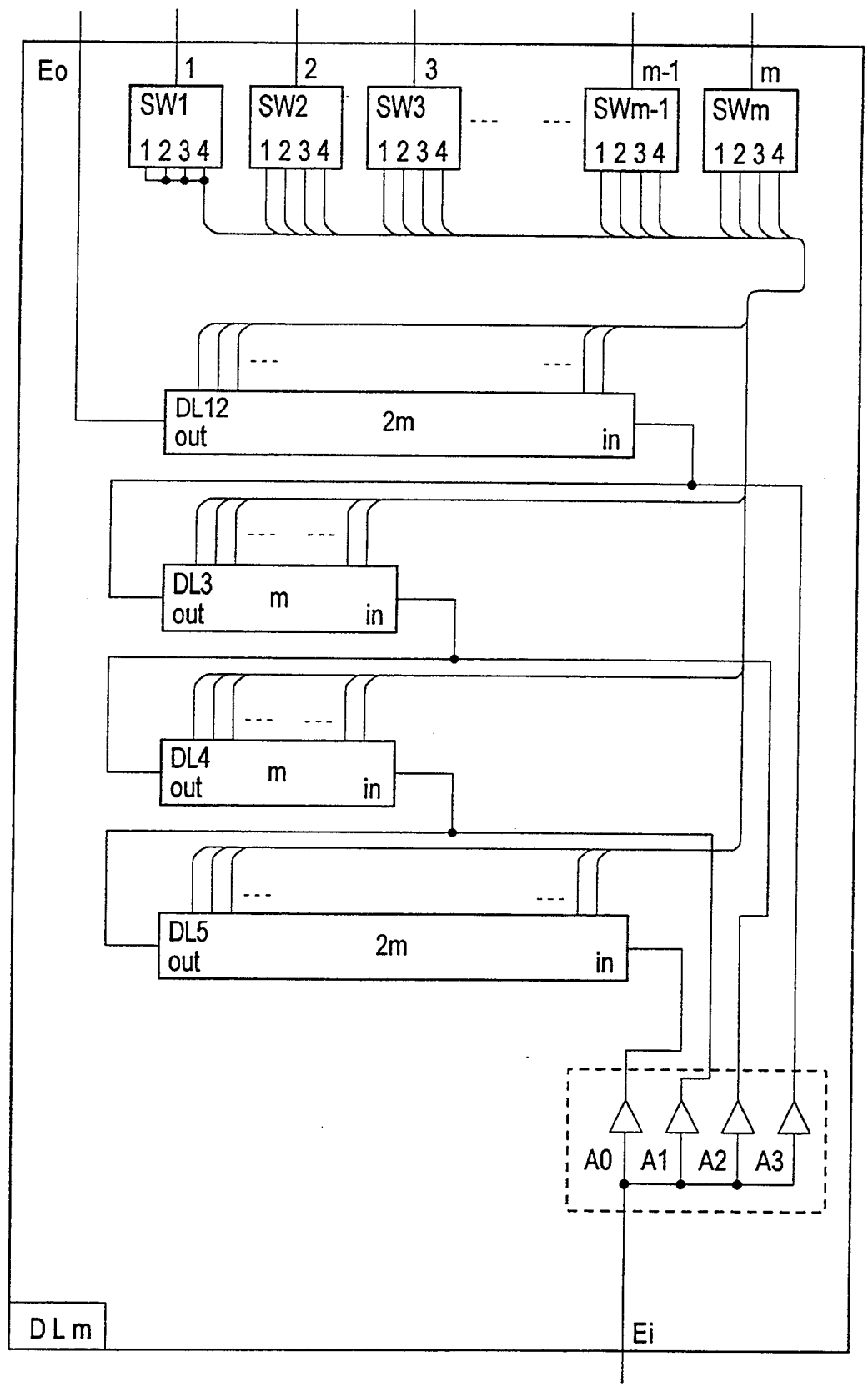
FIG. 1 is a diagram illustrating an example of a delay control block of the first embodiment of the first ultrasonic diagnostic apparatus according to the present invention.

FIG. 1 is an illustration of a delay control block DLm used in a first embodiment of a first ultrasonic diagnostic apparatus according to the present invention.

Figure 6:
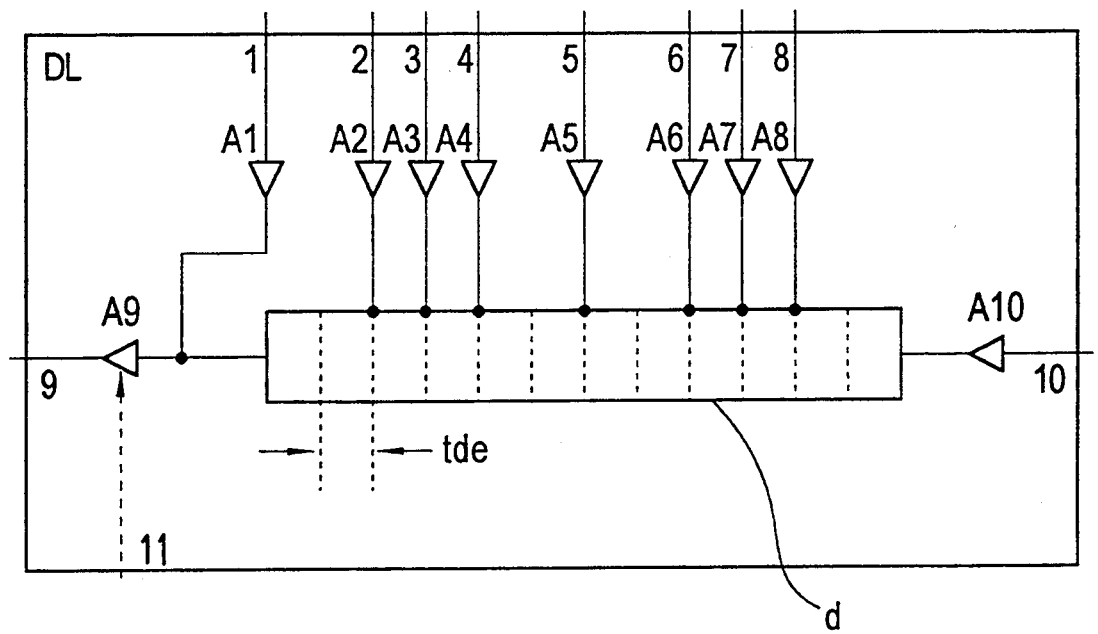
FIG. 6 is a diagram illustrating an example of the sub-delay line circuit DL in the third embodiment.

Though FIG. 6 will be described later in detail, it is briefly explained for the following descriptions. FIG. 6 shows an example of a sub-delay line circuit DL which consists of twelve delay elements for the same delay time tde and the taps of every two, three, four and six taps the delay line (sub-delay line) are connected to external terminals 1~8.

The first embodiment of the present invention is described below, referring to FIG. 1.

The sub-delay line circuit DL12 consists of 2 m sets of delay elements for the same delay time tde,
the sub-delay line circuit DL3 consists of m sets of delay elements for the same delay time tde,
the sub-delay line circuit DL4 consists of m sets of delay elements for the same delay time tde, and
the sub-delay line circuit DL5 consists of 2 m sets of delay elements for the same delay time tde.

For a 2.5 MHz probe, sub-delay line circuits DL12~DL5 can be divided by m for each 6×tde delay time and can be used as a delay line with m taps,
for a 3.5 MHz probe, sub-delay line circuits DL12~DL4 can be divided by m for each a 4×tde delay time and can be used as a delay line with m taps,
for a 5.0 MHz probe, sub-delay line circuits DL12~DL3 can be divided by m for each 3tde delay time and can be used as a delay line with m taps, and
for a 7.5 MHz probe, the sub-delay line circuit DL12 can be divided by m for each 2×tde delay time and can be used as a delay line with m taps.

In case of this configuration, the ratio of overall delay time in the delay control blocks is 6:4:3:2 for the 2.5 MHz probe vs. 3.5 MHz probe vs. 5.0 MHz probe vs. 7.5 MHz probe and approximately inversely proportional to the probe frequencies and the number of taps is fixed for respective frequencies. Thus, the above described configuration is adapted to the actualities in use of the ultrasonic diagnostic apparatus.

Correspondence of actual tap positions on the delay line in reference to the probe frequencies to external delay tap input terminals 1~m of the delay control block is determined by the analog switches SW1~SWm of input 1 and output 4; for example, the output side terminal 1, output side terminal 2, output side terminal 3 and output side terminal 4 of analog switches SW1~SWm can be connected respectively to the tap positions (described above) for the 7.5 MHz probe, 5.0 MHz probe, 3.5 MHz probe and 2.5 MHz probe. The direction should be set so that the delay time is shorter at the SW1 side and longer at the SWm side.

Variations of the ratio of overall delay time as described above can be obtained by changing connection of the input Ei(external input terminals) of this delay control block and sub-delay line circuit DL12~DL5. Specifically, it is necessary to make the connection to:
the input (internal input terminal at the input side terminating position) (the right end of DL5) of the sub-delay line circuit DL5 through the amplifier A0 for the 2.5 MHz probe,
the input (internal input terminal at the input side terminating position) (the right end of DL4) of the sub-delay delay line circuit DL4 through the amplifier A1 for the 3.5 MHz probe,
the input (internal input terminal at the input side terminating position) (the right end of DL3) of the sub-delay line circuit DL3 through the amplifier A2 for the 5.0 MHz probe, and
the input (internal input terminal at the input side terminating position) (the right end of DL12) of the sub-delay line circuit DL12 through the amplifier A3 for the 7.5 MHz probe.

In this case, only one of amplifiers A0~A3 which correspond to the probe frequencies can be kept ON and the others can be kept OFF (high impedance state) or can be kept in a state where only signal components are eliminated at the input side and only the DC components are outputted. Or only one of amplifiers A0~A3 can be selected by using an analog switch.

An output Eo (external output terminal) of the delay control block DLm is generated from an output terminal (left side end of DL12) of the sub-delay line circuit DL12. The input Ei and output Eo of the delay control block DLm are the input and output terminals for connecting the delay control blocks to each other, which can be connected with a single signal line.

Figure 2:
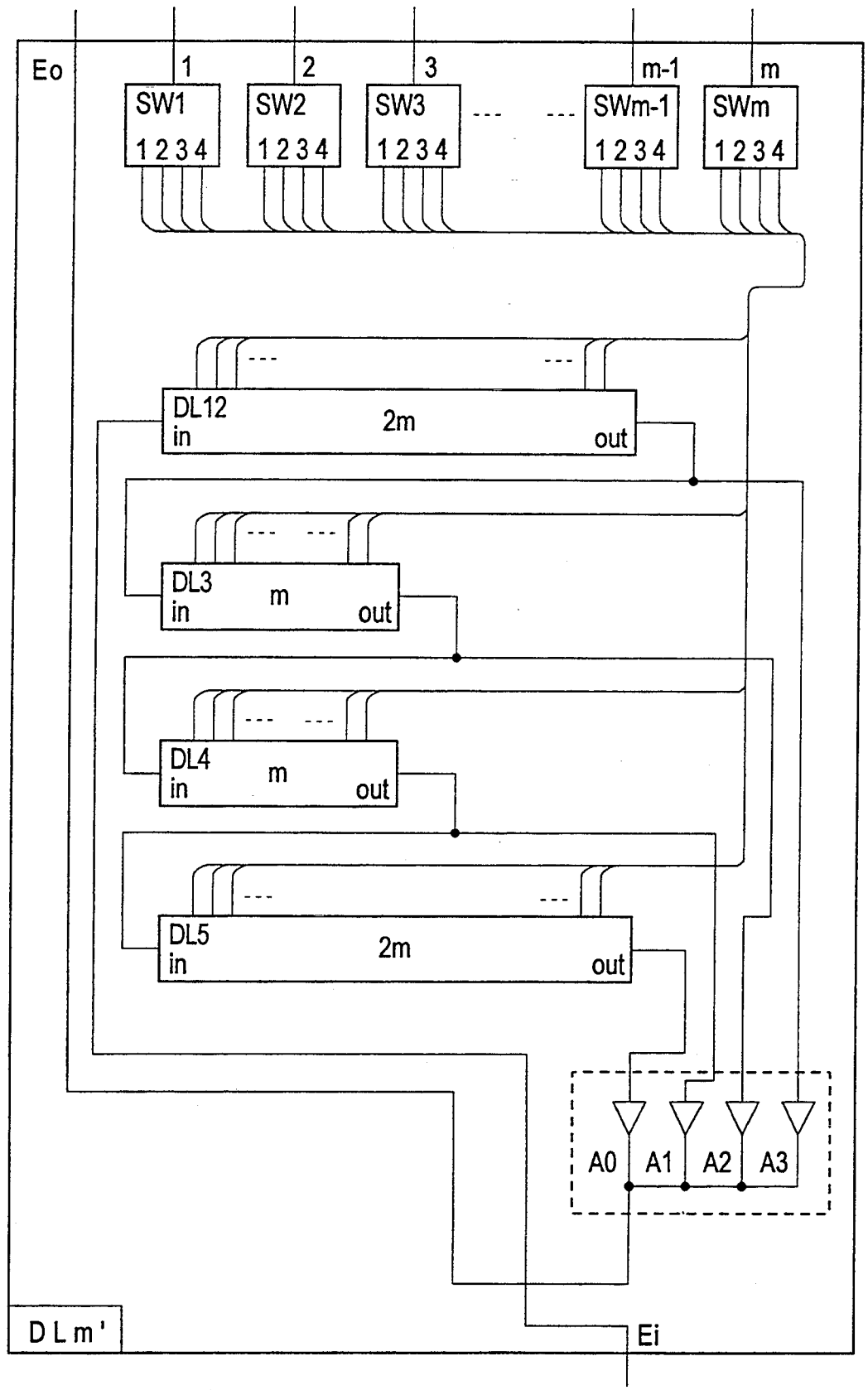
FIG. 2 is a diagram illustrating an example of a delay control block of the first embodiment of the second ultrasonic diagnostic apparatus according to the present invention.

FIG. 2 is an illustration of the delay control block DLm' used in the first embodiment of the second ultrasonic diagnostic apparatus according to the present invention. In FIG. 1, the variations of overall amount of delay for the probe frequencies are processed by changing over the inputs of sub-delay line circuits DL12, DL3, DL4 and DL5 and, in FIG. 2, the output of the delay control block DLm' is processed by changing over the outputs of sub-delay line circuits DL12, DL3, DL4 and DL5.

Specifically, the output of this delay control block DLm' can be connected to:
the output (internal output terminal located at the output side terminating position) (right side end of DL5) of the sub-delay line circuit DL5 through the amplifier A0 for the 2.5 MHz probe,
the output (internal output terminal located at the output side terminating position) (right side end of DL4) of the sub-delay line circuit DL4 through the amplifier A1 for the 3.5 MHz probe,
the output (internal output terminal located at the output side terminating position) (right side end of DL3) of the sub-delay line circuit DL3 through the amplifier A2 for the 5.0 MHz probe, and
the output (internal output terminal located at the output side terminating position) (right side end of DL12) of the sub-delay line circuit DL12 through the amplifier A3 for the 7.5 MHz probe.

An input Ei (external input terminal) of the delay control block DLm' may be connected to an input (left side end of DL12) of the sub-delay line circuit DL12. Sub-delay line circuits DL12, DL3, DL4 and DL5 are shown reversely to FIG. 1 and the configuration can be the same as in FIG. 1.

Others are the same as shown in FIG. 1.

The following describes the overall configuration of the delay control circuit (refer to FIG. 18) formed with the delay control block DLm (DLm') shown in FIG. 1 and FIG. 2.

Figure 3:
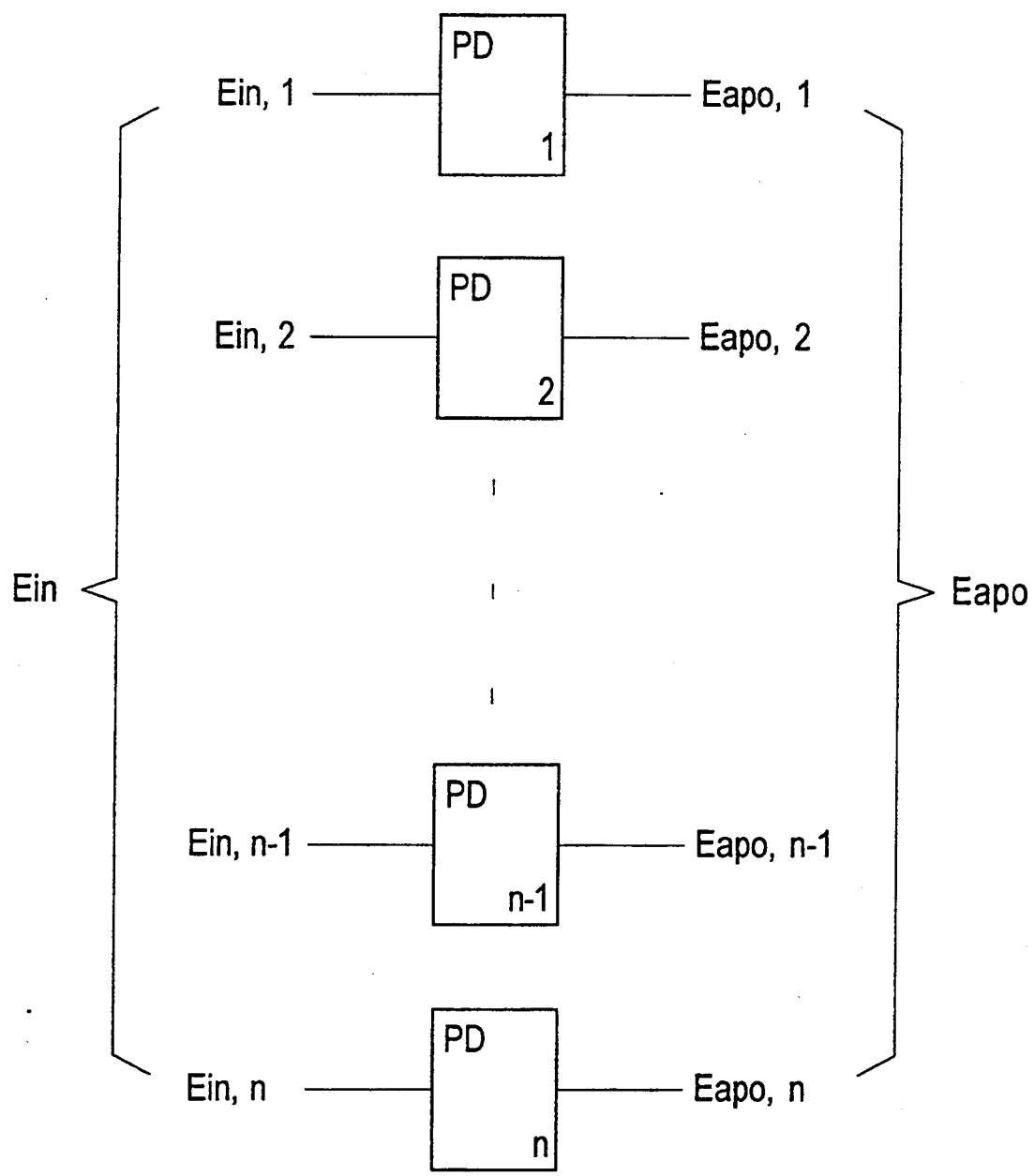
FIG. 3 is a diagram illustrating an example of the front stage part of the delay control circuit.

FIG. 3 shows an example of the front stage section of the delay control circuit. This section is a circuit which carries out precise (a) delay time control or (b) phase control within the minimum delay time control width in response to the probe frequency on the delay line of the rear stage with the signal Eapo from the apodizing circuit group (refer to FIG. 18) as input and outputs it as the Ein signal before the delay time control is carried out on the delay line of the rear stage.

Circuits PD1~PDn shown in FIG. 3 carry out precise (a) delay time control or (b) phase control within the above described delay time control width (one tap interval of tap terminals 1~m of the delay control block DLm (DLm')), and an example of (a) delay time control can refer to U.S. Pat. No. 4,707,813 which uses the delay line.

An example of (b) phase control can refer to U.S. Pat. No. 4,120,022 and U.S. Pat. No. 4,699,009 which use a mixer. This invention is intended to carry out a focus control by controlling the phases of carriers of received signals, for example, by the phase control within approximately a wavelength of ultrasonic wave.

In any event that the above (a) delay time control or the above (b) phase control is adopted, a large delay time is controlled by changing over the tap position on the delay line of the rear stage.

The number of signal channels of outputs Ein, 1~Ein, n of PD1~PDn is determined by the total number of elements of transducers and, if the connection of these signal channels is made as 1:1, the total number of elements is equal to the number of channels. As in case of U.S. Pat. No. 4,699,009, the number of signal channels may be reduced by adding two output signals of the mixer. Also in case of (a) delay time control described above, the signals of two or more elements can be added in the input or output of the circuit PD. The description of this part is omitted in the following paragraphs since it is common to all other cases in the following embodiments.

Figure 4:
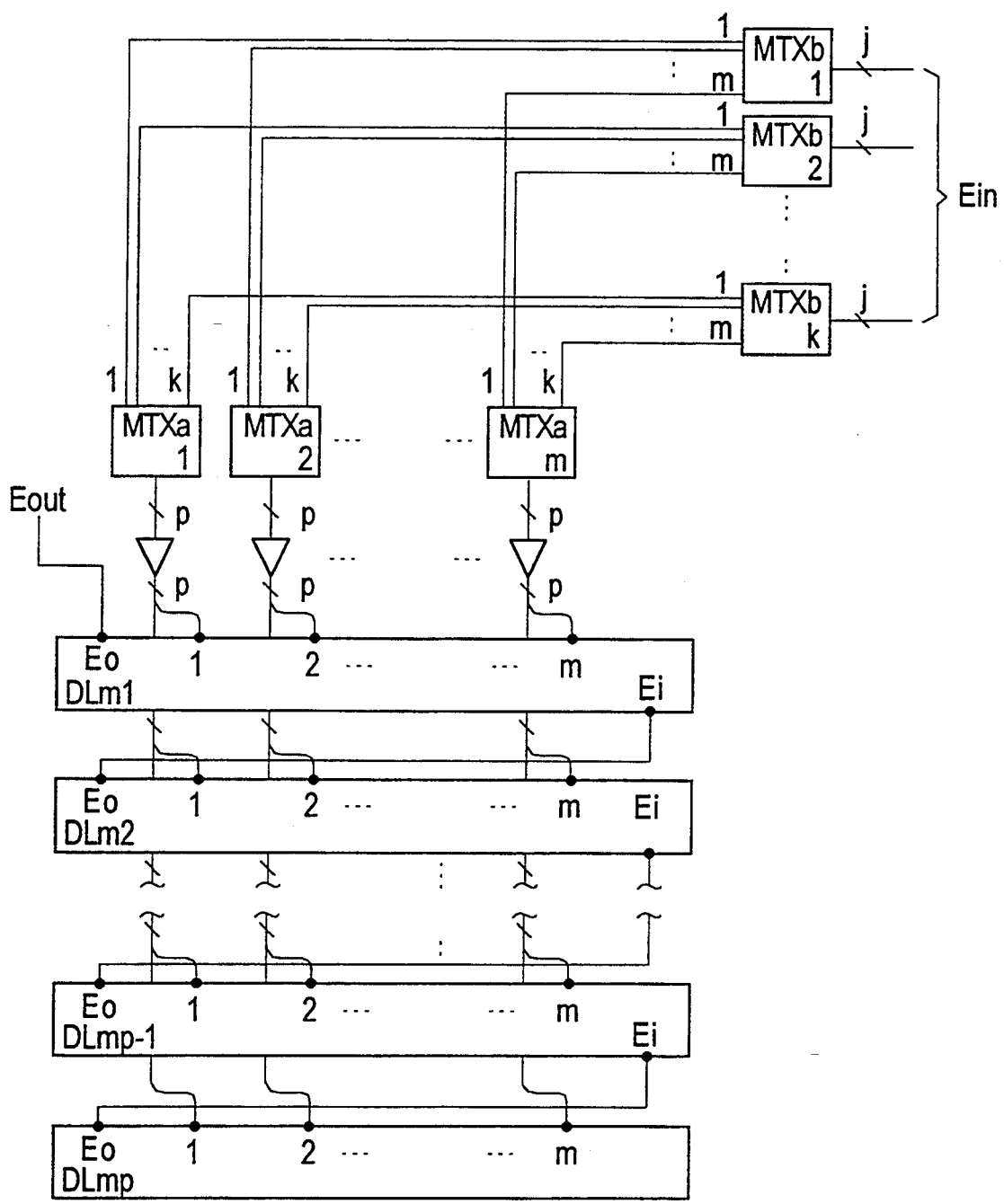
FIG. 4 is a diagram illustrating an example of the delay control circuit in the first embodiment.

FIG. 4 shows an example of the delay control circuit consisting of a delay line and analog switches which is used in the first embodiment and adapted to allow selection of a group of a fixed number of adjacent taps of the cyclically continuous delay line as a set. The number of channels for input Ein depends on the number of all elements of the transducers and, in case of 1:1 connection, the total number of elements is equal to the number of channels. In some cases, the number of signal channels is reduced by adding the signals of two or more elements in the phase control circuit or the delay control circuit between the Eapo signal and the input Ein; however, the following description does not include a substantial difference and therefore the description in case of 1:1 connection represents other probable descriptions.

Matrix switch MTXb is the first matrix switch specified in the present invention and, if it is provided with eight inputs, it can process the signals of eight elements. If the total number of elements is 128, sixteen matrix switches MTXb are required. If a wavelength for a specific frequency (for example, center frequency) within the frequency band of the ultrasonic probe is $\lambda$ (though $\lambda$ originally denotes a length, it is used to denote a time delay. $\lambda$ is hereafter used without notice in the following description), a delay control value of $8\lambda$ is required for eight elements when the maximum difference of delay amount required for control between optional adjacent elements is $\lambda$ and the control for eight taps is required per matrix switch MTXb when an intertap delay amount (as much as one tap) of tap terminals 1~m of the delay control block DLm is $\lambda$. This can be summarized as j=8, k=16 and m=8.

Matrix switch MTXa (the second matrix switch specified in the present invention) is a matrix switch for sixteen inputs according to k=16 and the number of output channels is determined according to the total amount of delay required for delay control of the probe. If the total amount of delay is $64\lambda$, eight delay control blocks DLm are required with p=8.

One input of an optional matrix switch MTXb which is particularly noted allows for selection of an optional matrix switch MTXa. An optional delay control block DLm can be selected by the matrix switch MTXa. Thus one optional input of an optional matrix switch MTXb allows for selection of an optional tap on the delay control blocks DLm1~DLmp.

The matrix switch MTXa can cyclically select a group of adjacent taps on the delay control block DLm (for example, taps 1, 2, ..., m on DLm1; taps 3, 4, ... m on DLm1 and taps 1, 2, on DLm2; ...; tap m on DLmp-1 and taps 1, 2, 3, ..., m-1 on DLmp; taps 1, 2, 3 ..., m-1, m on DLmp) as a set.

In case of such circuit construction:

a signal line extended from the matrix switch MTXa1 can be connected to tap 1of DLm1, DLm2 ... DLmp without crossing over a signal line extended from other matrix switches MTXa2~MTXam, a signal line extended from the matrix switch MTXa2 can be connected to tap 2 of DLm1, DLm2, ... DLmp without crossing over a signal line extended from other matrix switches MTXa1 and MTXa3~MTXam, ..., and a signal line extended from the matrix switch MTXam can be connected to tap m of DLm1, DLm2, ... DLmp without crossing over a signal line extended from other matrix switches MTXa1~MTXam-1.

Figure 5:
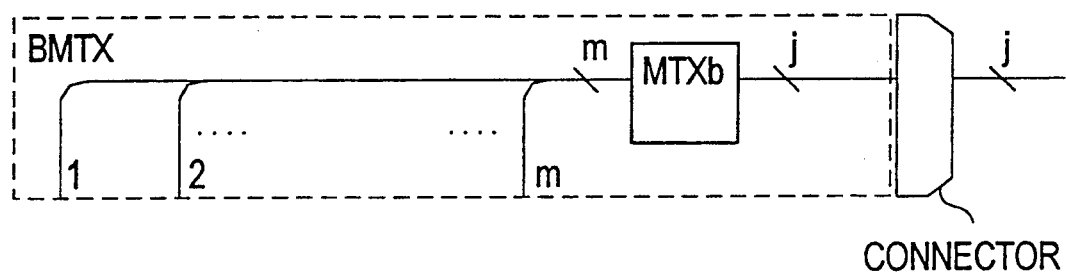
FIG. 5 is a diagram for explaining connection of the matrix switch MTXa and the matrix switch MTXb.

FIG. 5 is a diagram showing an example of connection between the matrix switch MTXa and the matrix switch MTXb.

Signals can be simply connected by preparing a sub-board BMTX on which one or more matrix switches MTXb (one in FIG. 5) are mounted (in case of FIG. 5, k sets of sub-boards are required) and mounting the sub-board BMTX on a master board on which delay control blocks DLm1, DLm2, ... DLmp and matrix switches MTXa1~MTXam.

Specifically, output terminals 1~m of the first sub-board BMTX (with MTXb1 mounted) are connected to the inputs 1 of matrix switches MTXa1, MTXa2, ... MTXam, output terminals 1~m of the second sub-board BMTX (with MTXb2 mounted) are connected to the inputs 2 of matrix switches MTXa1, MTXa2, ... MTXam, ..., and output terminals 1~m of the the sub-board BMTX (with MTXbk mounted) are connected to the inputs k of matrix switches MTXa1, MTXa2, ... MTXam.

The inputs of matrix switches MTXb1~MTXbk can be connected to desired circuits through connectors.

FIG. 6 is an example of the sub-delay line circuit DL which can be used in the third embodiment described in the foregoing.

Tap terminals 1~8 correspond to frequencies 2.5 MHz, 3.5 MHz, 5.0 MHz and 7.5 MHz. The sub-delay line d has the terminating resistors for input and output (not shown), the current embodiment signals from current amplifiers A1~A8 and A10 are added on these terminating resistors and a current signal of the result of addition from the amplifier A9 is outputted. The amplifier A10 is an input part for connecting the sub-delay line circuits to each other.

The amplifier A9 can be controlled to the OFF state (high impedance) with signal 11 (the amplifier A9 itself can be set to OFF or the switch of amplifier A9 which is provided at the output side can be set to OFF). Thus this sub-delay line circuit DL can be disconnected as required from other circuits according to signal 11. The same effect of disconnecting the sub-delay line circuit, can be obtained by merely setting the input side signal to OFF (eliminating only the AC component of the signal).

If the sub-delay line d consists of for example, 12 delay elements for the unit amount of delay tde=18 nsec as shown in FIG. 6, the following taps can be provided:

six taps (1, 2, 4, 5, 6 and 8) by providing the taps for 2×tde (36 nsec) for 7.5 MHz, four taps (1, 3, 5, and 7) by providing the taps for 3×tde (54 nsec) for 5.0 MHz, three taps (1, 4 and 6) by providing the taps for 4×tde (72 nsec) for 3.5 MHz, and two taps (1 and 5) by providing the taps for 6×tde (108 nsec) for 2.5 MHz.

In case of the above example, the amount of delay is set to have a value approximate to $\lambda/4$ when the wavelength of ultrasonic wave is determined $\lambda$ and it can be set to be finer (for example, to $\lambda/8$) or coarser (for example, $\lambda$) as desired. The sub-delay line d can be composed of a plurality of further finer sub-delay lines.

Figure 7:
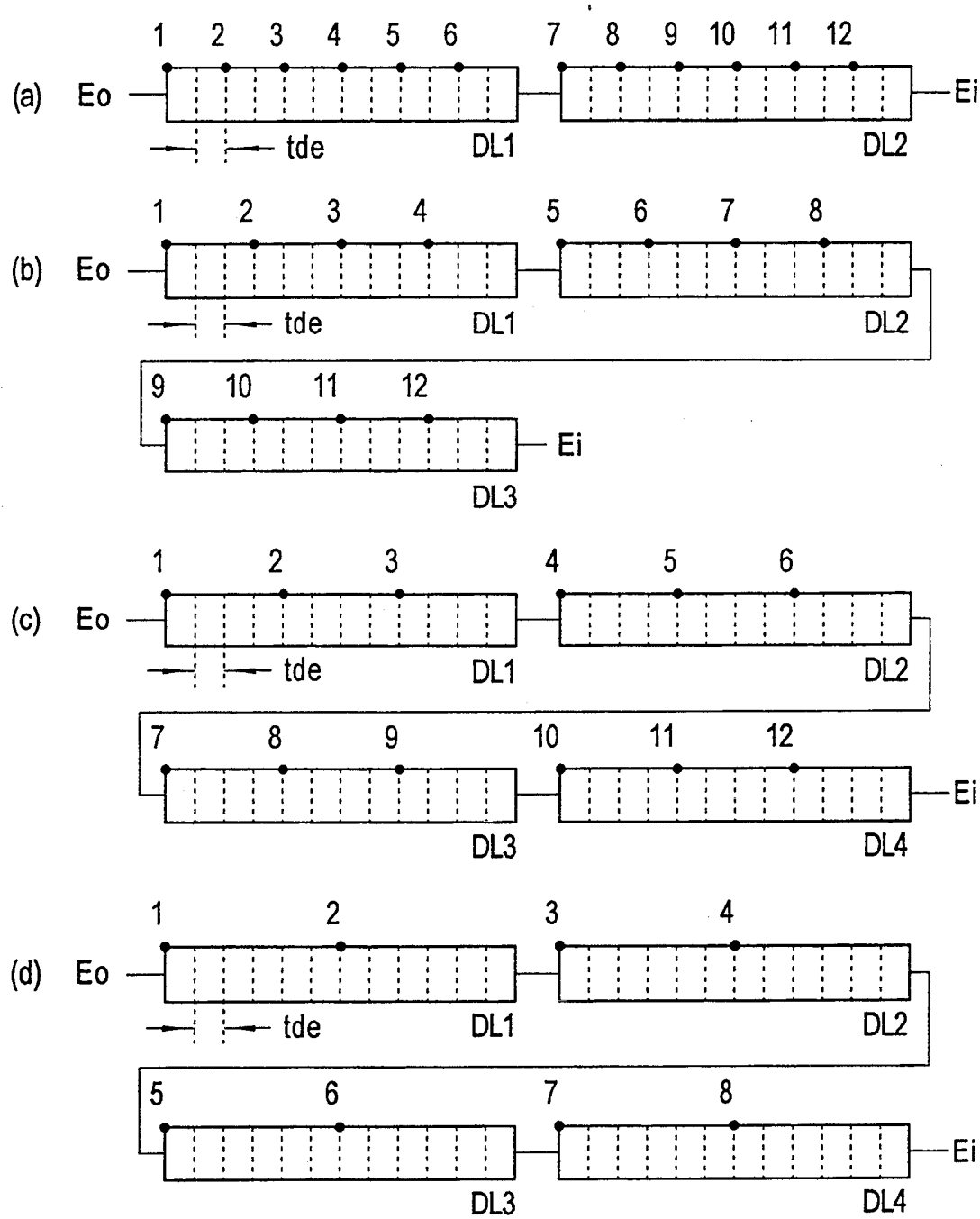
FIG. 7 is a diagram illustrating an example connection of the sub-delay line circuits DL in the third embodiment.

FIG. 7 shows an example of connection of the sub-delay line circuit DL which can be used in the third embodiment and the input terminal for the probe frequency is changed over at the input side of the sub-delay line circuit.

FIG. 7(a) shows an example of connection of the 7.5 MHz probe for which the sub-delay line circuit DL12 is formed by coupling DL1 and DL2 and sub-delay line circuits DL1 and DL2 can be of the same sub-delay line circuit DL (FIG. 6). For 7.5 MHz, taps are provided for each 2×tde (36 nsec) and the delay line has 12 taps.

FIG. 7(b) shows an example of connection of the 5.0 MHz probe for which the sub-delay line circuits DL1, DL2 and DL3 are used. Sub-delay line circuits DL1, DL2 and DL3 can be of the same sub-delay line circuit DL (FIG. 6). For 5.0 MHz, taps are provided for each 3×tde (54 nsec) and the delay line has 12 taps.

FIG. 7(c) shows an example of connection of the 3.5 MHz probe for which the sub-delay line circuits DL1, DL2, DL3 and DL4 are used. Sub-delay line circuits DL1, DL2, DL3 and DL4 can be of the same sub-delay line circuit DL (FIG. 6). For 3.5 MHz, taps are provided for each 4×tde (72 nsec) and the delay line has 12 taps.

FIG. 7(d) shows an example of connection of the 2.5 MHz probe for which the sub-delay line circuits DL1, DL2, DL3 and DL4 are used. Sub-delay line circuits DL1, DL2, DL3 and DL4 can be of the same sub-delay line circuit DL (FIG. 6). For 2.5 MHz, taps are provided for each 6×tde (108 nsec) and the delay line has eight taps. Though the number of taps for the 2.5 MHz probe is reduced, the total amount of delay is the same as for the 3.5 MHz probe and available up to the same size of aperture as for the 3.5 MHz probe. If the construction for which the number of taps for 3.5 MHz is fixed even for 2.5 MHz is employed, the total amount of delay is as large as 1.5 times and yet uneconomical.

The reason why the input Ei and the output Eo are always located at the end of the delay line (terminating position) is that a reflection component of a signal is large at a stage of the delay line and the characteristics will substantially deteriorate after the signal has passed a plurality of delay line stages if a plurality of delay lines are connected in series at the positions other than the terminating position.

Though the terminating resistors and the buffer amplifiers are not shown in FIG. 7, each sub-delay line at least shown in FIG. 7 must be terminated. The delay line can be terminated at finer terminating positions than shown in FIG. 7. However, the optimal terminating points are determined in view of the number of additional amplifiers, manufacturing processes of the delay lines and mounting technique.

Figure 8:
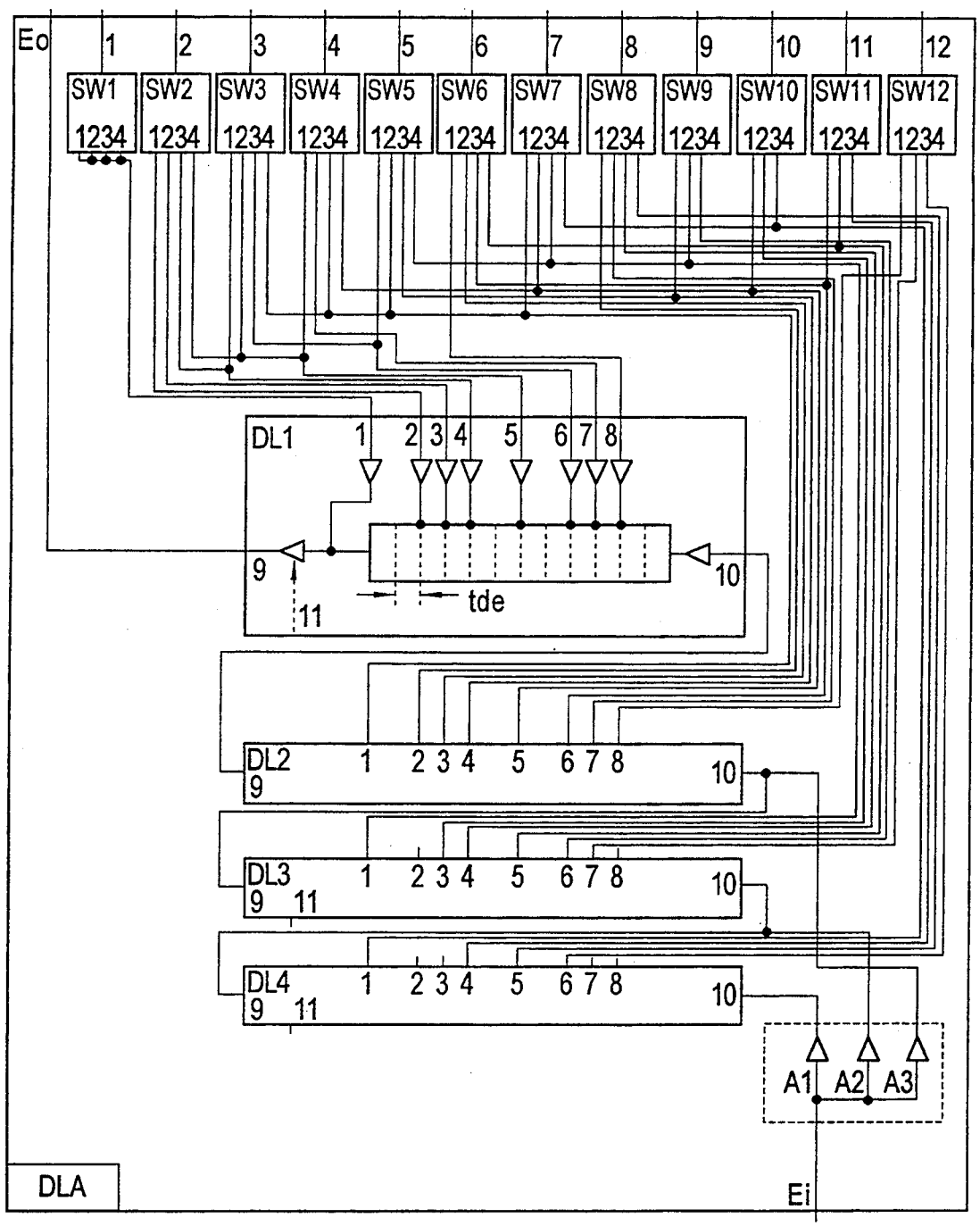
FIG. 8 is a diagram illustrating an example of the delay control block in the third embodiment.

FIG. 8 is an illustration of the delay control block used in the third embodiment and shows the connection shown in FIG. 7 as a concrete circuit diagram.

The sub-delay line circuit DL12 is formed with two identical sub-delay line circuits (FIG. 6) DL1 and DL2. These sub-delay line circuits DL1 and DL2 consist of 2×12 delay elements for the same amount of delay tde, the sub-delay line circuit DL3 consists of 12 delay elements for the same amount of delay and the sub-delay line circuit DL4 consists of 12 delay elements for the same amount of delay.

For the 2.5 MHz probe, the sub-delay line circuits DL1 ~DL4 can be divided by 8 for each 6×tde delay amount and used as an 8-tap delay line;

for the 3.5 MHz probe, the sub-delay line circuits DL1 ~DL4 can be divided by 12 for each 4×tde delay amount and used as a 12-tap delay line;

for the 5.0 MHz probe, the sub-delay line circuits DL1 ~DL3 can be divided by 12 for each 3×tde delay amount and used as a 12-tap delay line; and for the 7.5 MHz probe, the sub-delay line circuits DL1 ~DL2 can be divided by 12 for each 2×tde delay amount and used as a 12-tap delay line.

In case of such circuit configuration, the ratio of the total amount of delay in the delay control blocks is 4:4:3:2 for 2.5 MHz probe vs. 3.5 MHz probe vs. 5.0 MHz probe vs. 7.5 MHz probe and the ratio as to the 3.5 MHz probe to the 7.5 MHz probe is approximately inversely proportional to the probe frequencies and the number of taps is fixed for respective probe frequencies. In addition, economical advantages can be preferentially taken into account for the circuit configuration for the 2.5 MHz probe. Thus the circuit configuration is adapted for operating conditions of the ultrasonic diagnostic apparatus.

Actual tap positions on the delay line for the probe frequencies and the external delay tap input terminals 1~12 of the delay control blocks are mated by analog switches SW1~SW12 for one input and four outputs. For example, the output side terminal 1 of each of analog switches SW1~SW12 can be connected to the tap position for the 7.5 MHz probe, the output side terminal 2 to the tap position for the 5.0 MHz probe, the output side terminal 3 to the tap position for the 3.5 MHz probe and the output side terminal 4 to the tap position for the 2.5 MHz probe.

The direction of connection should be such that the delay amount is least at the SW1 side and gradually increased towards the SW12 side.

Variations of the ratio of the total amount of delay as 4:4:3:2 described above can be satisfied by changing connection of the input Ei of the delay control block and sub-delay line circuits DL1~DL4.

In other words, the connection can be made to:

the input (right side end of DL4) of the sub-delay line circuit DL4 through amplifier A1 for 2.5 MHz and 3.5 MHz probes, the input (right side end of DL3) of the sub-delay line circuit DL3 through amplifier A2 for 5.0 MHz probe, and the input (right side end of DL2) of the sub-delay line circuit DL2 through amplifier A3 for 7.5 MHz probe.

In this case, only those amplifiers A0~A3 which correspond to the probe frequencies can be kept ON and the others can be kept OFF (high impedance state) or can be kept in a state where only signal components are eliminated at the input side and only the DC components are outputted. Or only one of amplifiers A0~A3 can be selected by using an analog switch.

When the sub-delay line circuit DL3 is not used, the delay line can be controlled so that the circuit from terminal 11 of DL3 to the final stage amplifier of DL3 is set to OFF. When the sub-delay line circuit DL4 is not used, the delay line can be controlled so that the circuit from terminal 11 of DL4 to the final stage amplifier of DL4 is set to OFF. The output Eo of the delay control block DLA is extended from the output (left side end of DL1) of the sub-delay line circuit DL1.

Input Ei and output Eo of the delay control blocks are the input and output terminals for connecting the delay control blocks to each other and can be connected with a single signal line.

Figure 9:
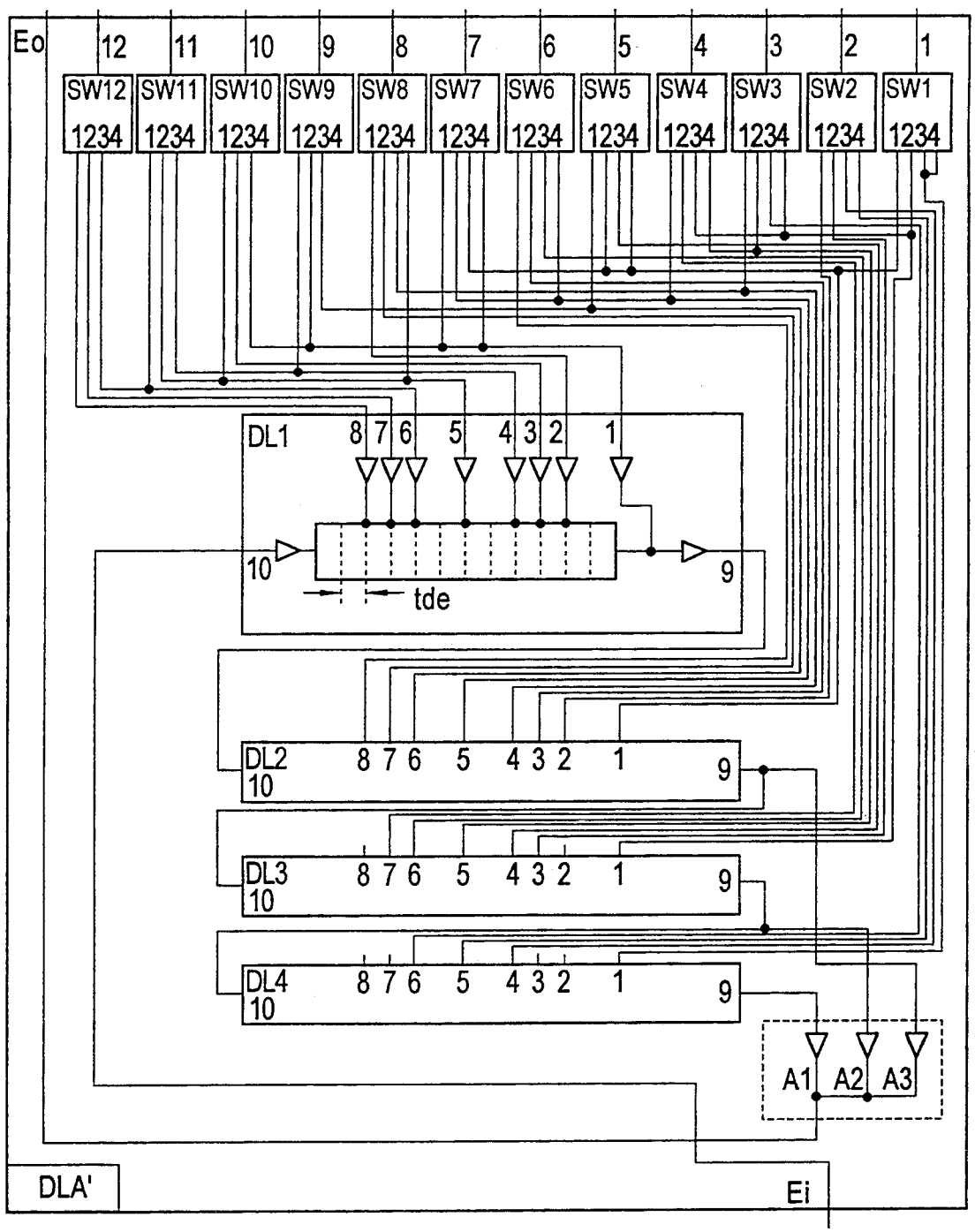
FIG. 9 is a diagram illustrating an example of the delay control block in the third embodiment.

FIG. 9 is an illustration of the delay control block used in the third embodiment. In FIG. 8, the variations of overall amount of delay for the probe frequencies are satisfied by changing over the inputs of sub-delay line circuits DL1, DL2, DL3 and DL4 and, in FIG. 9, the variations are satisfied by changing over the outputs of the delay control block by changing over the outputs of sub-delay line circuits DL1, DL2, DL3 and DL4.

Specifically, the output of this delay control block can be connected to:

the output (right side end of DL4) of the sub-delay line circuit DL4 through the amplifier A1 for the 2.5 MHz and 3.5 MHz probes, the output (right side end of DL3) of the sub-delay line circuit DL3 through the amplifier A2 for the 5.0 MHz probe, and the output (right side end of DL2) of the sub-delay line circuit DL2 through the amplifier A3 for the 7.5 MHz probe.

An input Ei of the delay control block DLA' may be connected to an input (left side end of DL1) of the sub-delay line circuit DL1. Sub-delay line circuits DL1, DL2, DLB and DL4 are shown reversely to FIG. 8 and the configuration can be as same as in FIG. 8.

Others are the same as shown in FIG. 8.

As described above, either the input or the output can be changed over in response to the probe frequency. The following describes an example of changeover only at the input side.

Figure 10:
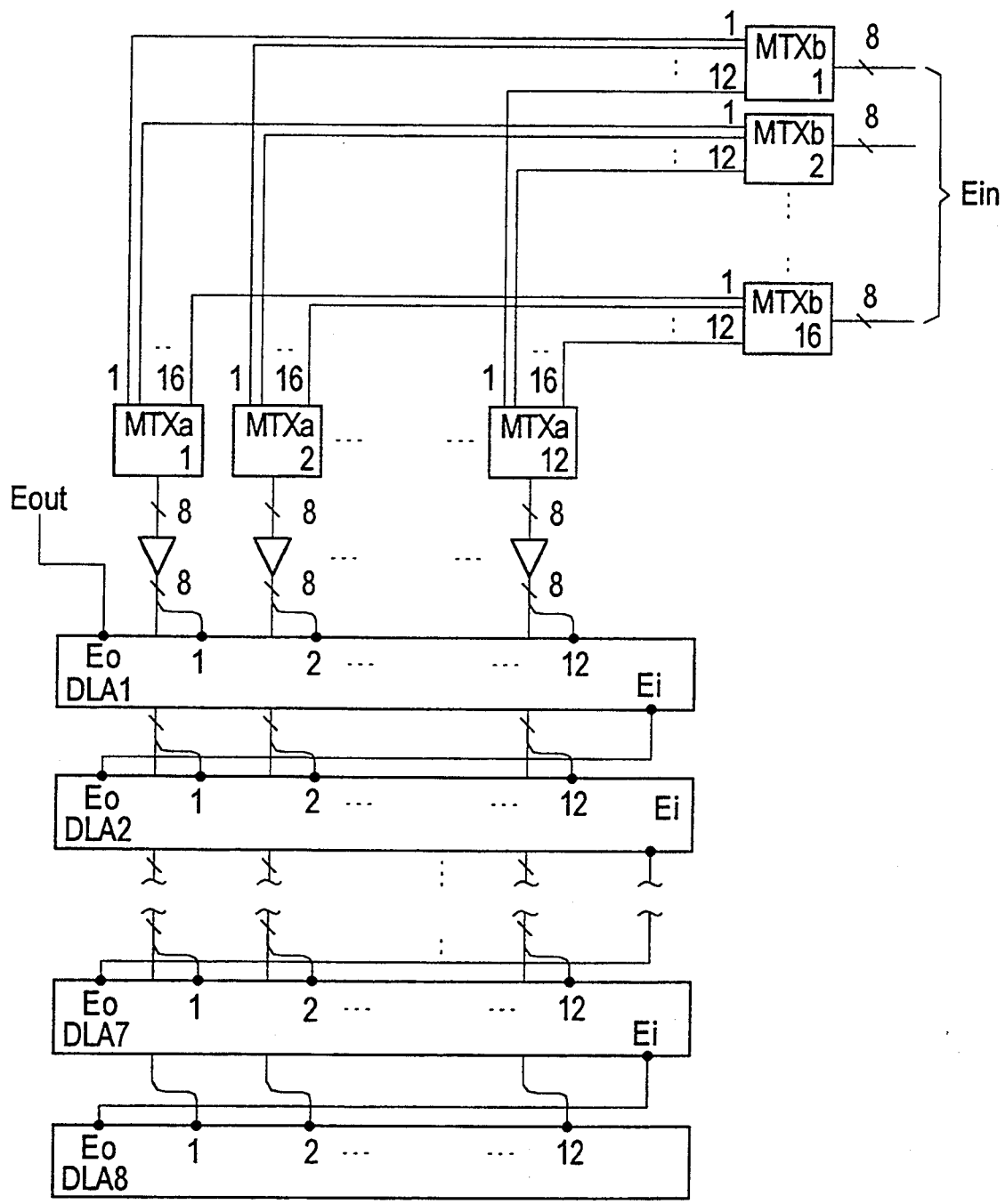
FIG. 10 is a diagram illustrating an example of the delay control circuit in the third embodiment.

FIG. 10 shows an example of the delay control circuit consisting of a delay line and analog switches which is used in the third embodiment and adapted to allow selection of a group of a fixed number of adjacent taps of the cyclically continuous delay line as a set. The number of channels for input Ein depends on the number of all elements of the transducers and, in case of 1:1 connection, the total number of elements is equal to the number of channels. In some cases, the number of signal channels is reduced by adding the signals of two or more elements in the phase control circuit or the delay control circuit between the Eapo signal and the input Ein; however, the following description does not include a substantial difference and therefore the description in case of 1:1 connection represents other probable descriptions. Matrix switches MTXb are able to process the signals of eight elements if they are provided with eight inputs. If the total number of elements is 128, sixteen matrix switches MTXb are required.

If the maximum difference of delay amount between optional adjacent elements is $(\frac{3}{4}) \times \lambda$, the delay amount to be controlled of $6\lambda$ is required for eight elements and, if the inter-tap delay amount of tap terminals 1~12 of the delay control block DLA is $\lambda/2$, the control for 12 taps is required for one matrix switch MTXb. This can be summarized as j=8, k=16 and m=12.

Matrix switch MTXa is a matrix switch with sixteen inputs according to k=16 and the number of output channels is determined according to the total amount of delay required for delay control of the probe. If the total amount of delay is $48\lambda$, eight delay control blocks DLA (($\lambda/2$) ×12 taps) are required with p=8. However, for the 2.5 MHz probe, the total amount of delay is $32\lambda$ because the delay control block DLA provides $(\lambda/2) \times 8$.

An optional input of an optional matrix switch MTXb, which is particularly noted, allows for selection of an optional matrix switch MTXa. An optional delay control block DLA can be selected by the matrix switch MTXa. Thus an optional input of an optional matrix switch MTXb allows for selection of an optional tap on the delay control blocks DLA1~DLA8.

The matrix switch MTXa can cyclically select a group of adjacent taps on the delay control block DLA (for example, taps 1, 2, ..., 12 on DLA1; taps 3, 4, ... 12 on DLA1 and taps 1, 2 on DLA2; ...; tap 12 on DLA7 and taps 1, 2, 3, ... 11 on DLA8; taps 1, 2, 3, ..., 11, 12 on DLA8 ) as a set. For the 2.5 MHz probe, taps 1~8 on the delay control block DLA are cyclically selected.

In case of such circuit construction, a signal line extended from the matrix switch MTXa1 can be connected to tap 1 of DLA1, DLA2, ..., DLA8 without crossing over a signal line extended from other matrix switches MTXa2~MTXa12, a signal line extended from the matrix switch MTXa2 can be connected to tap 2 of DLA1, DLA2 ... DLA8 without crossing over a signal line extended from other matrix switches MTXa1 and MTXa3~MTXa12, and a signal line extended from the matrix switch MTXa12 can be connected to tap 12 of DLA1, DLA2, ..., DLA8 without crossing over a signal line extended from other matrix switches MTXa1~MTXa11.

An example of connection of matrix switches MTXa and matrix switches MTXb can be the same as shown in FIG. 5.

Signal Eout generated from the output Eo of DLA1 is the final output of the delay control circuit.

Figure 11:
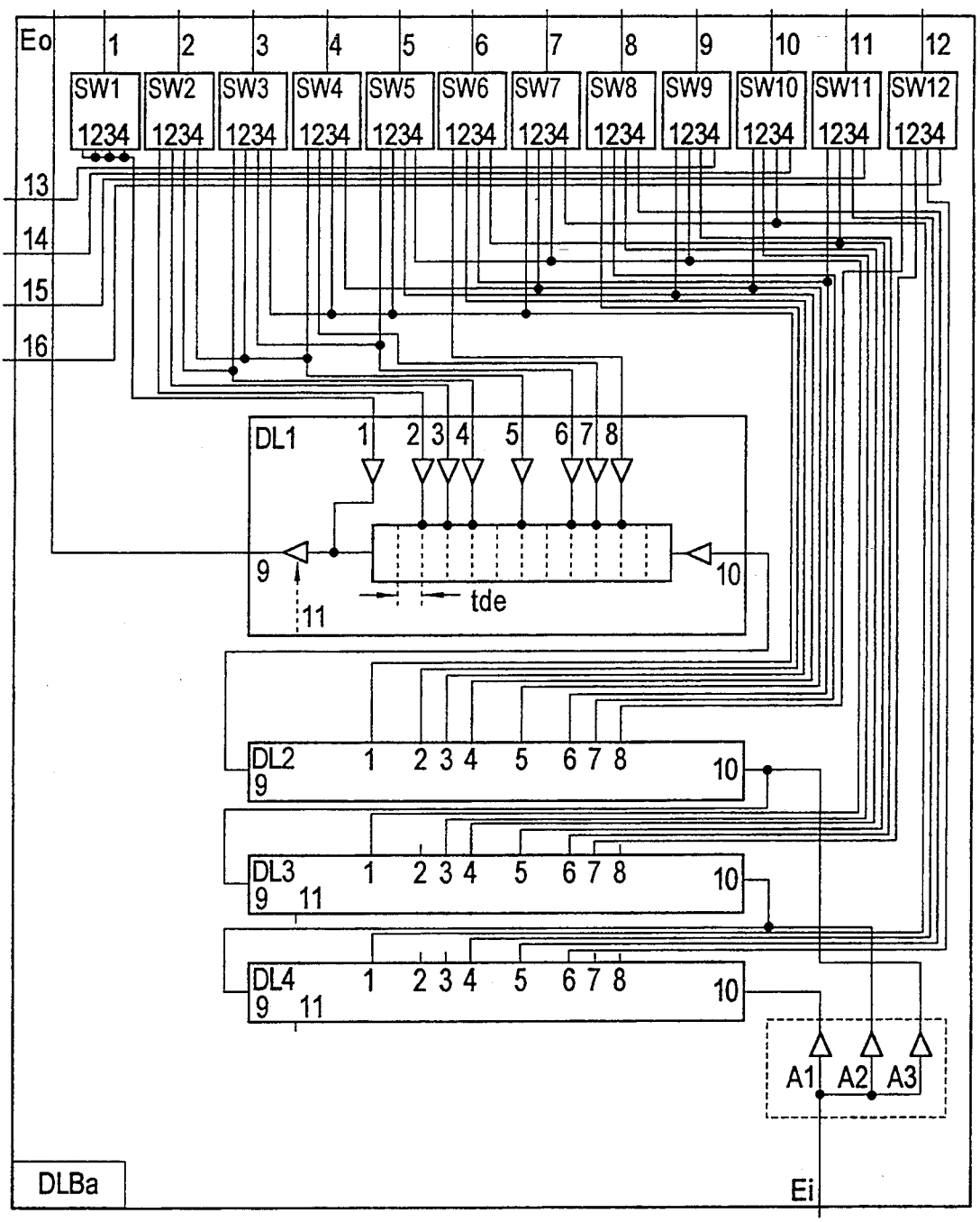
FIG. 11 is a diagram illustrating an example of the delay control block DLBa in the fourth embodiment.

FIG. 11 is an illustration of the delay control block DLBa used in the fourth embodiment.

Judging from the types and control ranges of commercially sold matrix switches, a suitable number of output terminals of matrix switches MTXa1~MTXam (refer to FIG. 4) is approximately 8 or 12 and therefore a suitable number of taps on the delay control block is approximately 8 or 12. In case of 12 taps, such construction can be easily realized as described above. However, in case eight taps are provided and DL5 is omitted, the number of taps on the delay control block is changed (from 12 to 8) for the 2.5 MHz probe and therefore the 2.5 MHz probe with the above configuration (refer to FIG. 8) will be discontinued even though two delay control blocks each having 12 taps are to be used as a group of taps consisting of 8 taps×3 channels because signals are not sent to four taps 9~12 on the delay control blocks. Therefore, the terminals are provided out of DLBa from the output terminals of SW9~SW12 which are not used.

Specifically, the output 4 of SW9 is connected to the external terminal 13,
the output 4 of SW10 is connected to the external terminal 14,
the output 4 of SW11 is connected to the external terminal 15, and
the output 4 of SW12 is connected to the external terminal 16.

Other are similar to FIG. 8.

Figure 12:
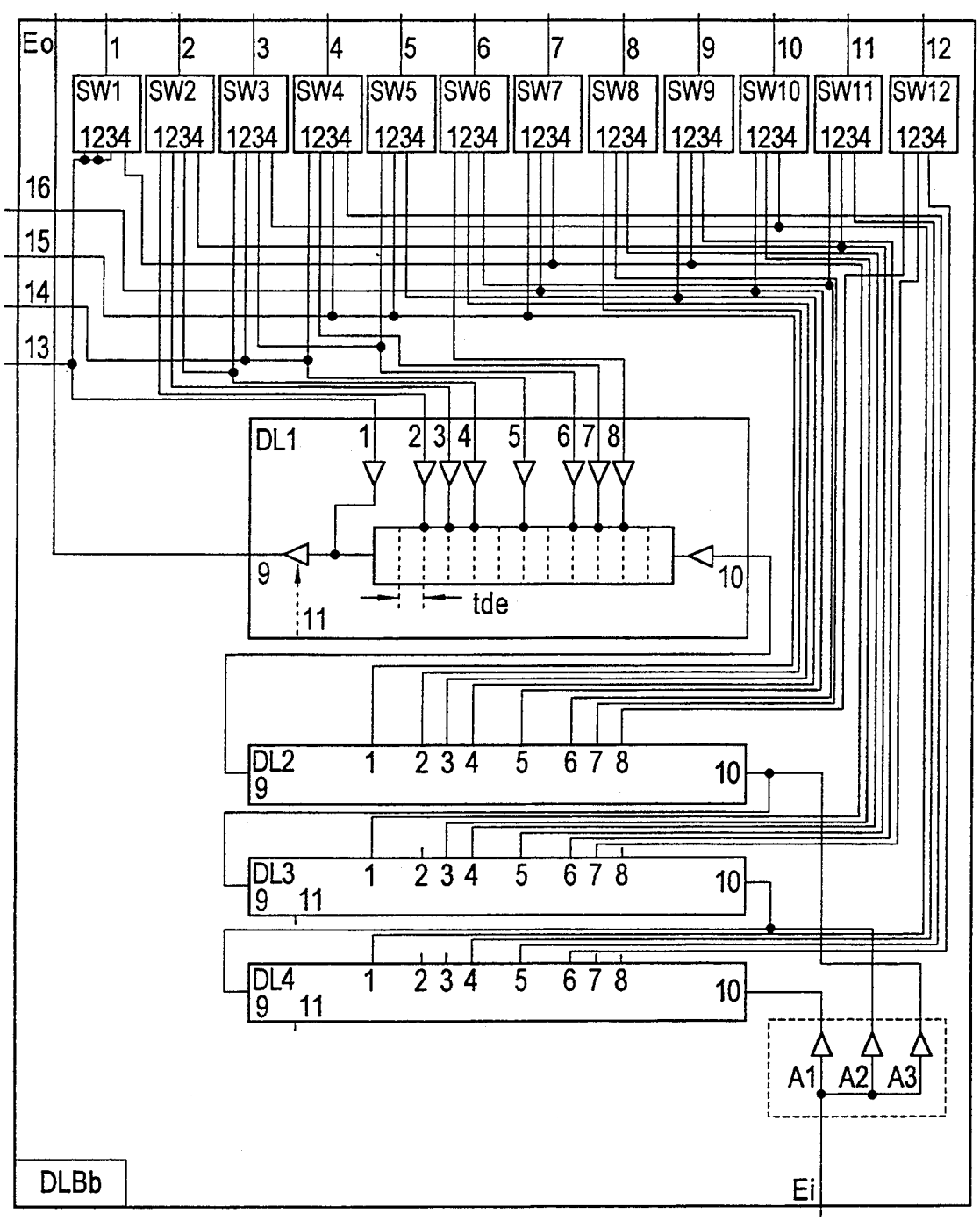
FIG. 12 is a diagram illustrating an example of the delay control block DLBb in the fourth embodiment.

FIG. 12 is an illustration of the delay control block DLBb used in the fourth embodiment.

This delay control block DLBb is used in combination with the delay control block DLBa shown in FIG. 11, and the delay line construction DLB which has a group of taps consisting of 8 taps×3 channels can be formed by combining these two delay control blocks DLBa and DLBb.

In the delay control block DLBb, only the delay taps for the 2.5 MHz probe are connected in a special pattern.

Specifically, in the delay control block DLBb;
the minimum delay tap position (delay amount 0) for the 2.5 MHz probe is connected to the external terminal 13 of DLBb,
the second delay tap position (delay amount 6×tde) to the external terminal 14 of DLBb,
the third delay tap position (delay amount 12×tde) to the external terminal 15 of DLBb,
the fourth delay tap position (delay amount 18×tde) to the external terminal 16 of DLBb, and
the fifth delay tap position (delay amount 24×tde) is connected to the output 4 of SW1 of DLBb,
the sixth delay tap position (delay amount 30×tde) is connected to the output 4 of SW2 of DLBb,
the seventh delay tap position (delay amount 36×tde) is connected to the output 4 of SW3 of DLBb, and
the eighth delay tap position (delay amount 42×tde) is connected to the output 4 of SW4 of DLBb.

Others are similar to FIG. 8.

Figure 13:
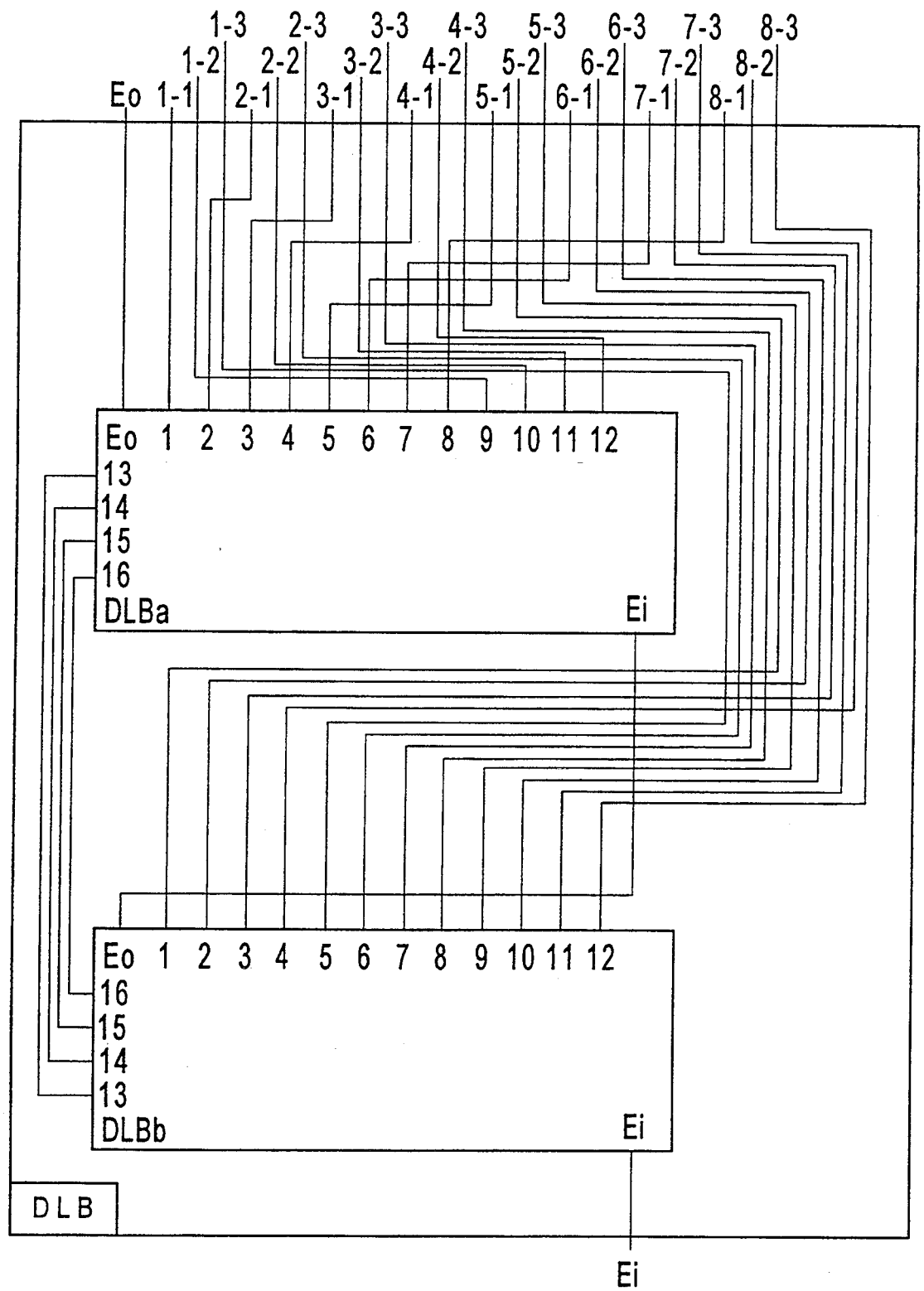
FIG. 13 is a diagram illustrating an example of the delay line construction DLB in the fourth embodiment.

FIG. 13 is an illustration of the delay line construction DLB used in the fourth embodiment.

The delay control block DLBa is used in combination with the delay control block DLBb and the delay line construction DLB which has a group of taps consisting of 8 taps×3 channels can be formed with these two delay control blocks DLBa and DLBb.

Specifically, the terminal 13 of the delay control block DLBa and the terminal 13 of the delay control block DLBb,
the terminal 14 of the delay control block DLBa and the terminal 14 of the delay control block DLBb,
the terminal 15 of the delay control block DLBa and the terminal 15 of the delay control block DLBb, and
the terminal 16 of the delay control block DLBa and the terminal 16 of the delay control block DLBb are connected,
and the taps 1~8 of delay control block DLBa are connected to the tap terminals 1-1~8-1 of the delay line construction DLB,
the taps 9~12 of delay control block DLBa can be connected to the tap terminals 1-2~4-2 of the delay line construction DLB,
the taps 1~4 of delay control block DLBb can be connected to the tap terminals 5-2~8-2 of the delay line construction DLB, and
the taps 5~12 of delay control block DLBb can be connected to the tap terminals 1-3~8-3 of the delay line construction DLB.

The external input terminal Ei of the delay line construction DLB is connected to the input terminal Ei of the delay control block DLBb,
the external output terminal Eo of the delay control block DLBb is connected to the input terminal Ei of the delay control block DLBa, and
the external output terminal Eo or the delay control block DLB is connected to the output terminal Eo of the delay control block DLBa.

If connected as described above, the tap terminals 1-1~8-1 of the delay line construction DLB form an assembly of adjacent taps (number of taps=8). Tap terminals 1-2~8-2 form the next assembly of adjacent taps which starts from the tap adjacent to tap 8-1. Successively, tap terminals 1-3~8-3 form the next assembly of adjacent taps which starts from the tap adjacent to tap 8-2. However, for the 2.5 MHz probe, one delay line construction DLB corresponds to two delay control blocks which respectively have eight taps and tap terminals 1-3~8-3 are not used.

Figure 14:
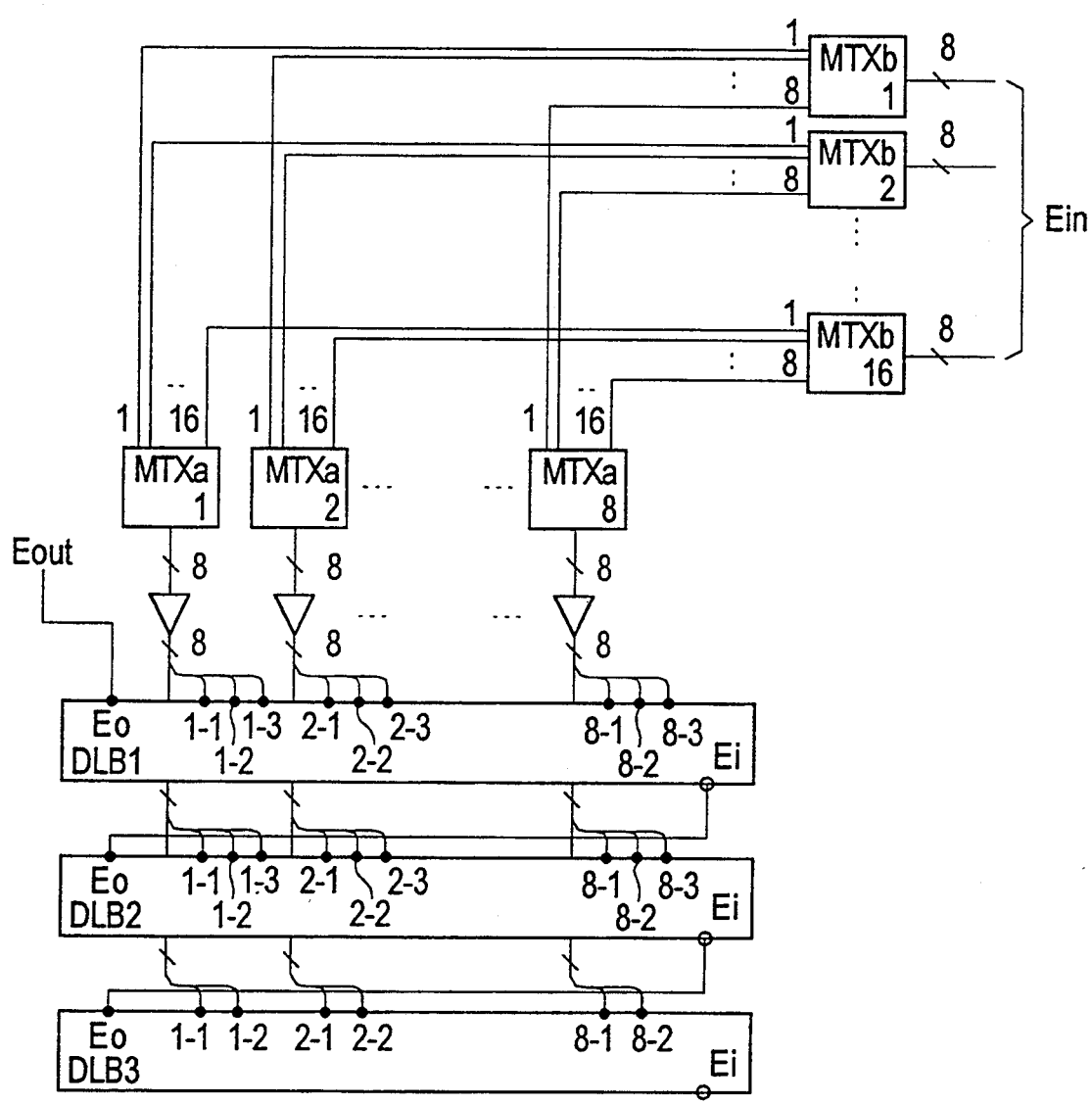
FIG. 14 is a diagram illustrating an example of the delay control circuit in the fourth embodiment.

FIG. 14 shows an example of the delay control circuit for use in the fourth embodiment which is formed by the delay line and analog switches to allow selection of an assembly consisting of a fixed number of adjacent taps of the cyclically continuous delay line as a set. The number of channels for input Ein depends on the number of all elements of the transducers and, in case of 1:1 connection, the total number of elements is equal to the number of channels. In some cases, the number of signal channels is reduced by adding the signals of two or more elements in the phase control circuit or the delay control circuit between the Eapo signal and the input Ein; however, the following description does not include a substantial difference from the above description and therefore the description in case of 1:1 connection represents other probable descriptions. The matrix switch MTXb which is provided for eight inputs is able to process the signals from eight elements. If the total number of elements is 128, sixteen matrix switches MTXb are required.

If the maximum difference of delay between optional adjacent elements is $\lambda$, a delay control amount of $8\lambda$ is required for eight elements and, if an inter-tap delay amount (as much as one tap) of tap elements 1~12 of the delay control blocks DLBa and DLBb is $\lambda$, the delay control of eight taps is also required for one matrix switch MTXb. This can be summarized as j=8, k=16 and m=8.

The matrix switch MTXa serves as a matrix switch having sixteen inputs according to k=16 and the number of output channels is determined by the total amount of delay required for delay control of the probe. If the total amount of delay is $64\lambda$, eight delay control blocks are required as p=8 based on an assumption of a delay control block with eight taps. For the 2.5 MHz probe, however, six delay control blocks each having eight taps are required and therefore the total amount of delay is $48\lambda$.

In this case, three delay line constructions DLB are required since one delay line construction DLB covers three delay control blocks each having eight taps. In case of the 2.5 MHz probe, however, three delay line constructions DLB are similarly required since one delay line construction DLB covers two delay control blocks. For 2.5 MHz probe, taps 1-3, 2-3, ..., 8-3 of the delay line constructions DLB are not used and the delay control should be carried out on assumption that only taps 1-1, 2-1, ..., 8-1 and 1-2, 2-2, ..., 8-2 are available.

An optional input of an optional matrix switch MTXb, which is particularly noted, allows for selection of an optional matrix switch MTXa. An optional one of the delay control blocks each having eight taps, which are assumed, can be selected by the matrix switch MTXa. Thus an optional input of an optional matrix switch MTXb allows to select an optional tap in the delay line constructions DLB.

The matrix switch MTXa can cyclically select a group of continuous taps on the delay control block DLB (for example, taps 1-1, 2-1, ..., 8-1 on DLB1; taps 3-1, 4-1, ... 8-1, 1-2, 2-2 on DLB1; ....; taps 1-1, 2-1, ..., 8-1 on DLB2; taps 3-1, 4-1, ..., 8-1, 1-2, 2-2 on DLB2; taps 1-1, 2-1, ..., 8-1 on DLB3; taps 3-1, 4-1, ..., 8-1, 1-2, 2-2 on DLB3; and taps 1-2, 2-2, ..., 8-2 on DLB3) as a set.

In case of such circuit construction,
a signal line extended from the matrix switch MTXa1 can be connected to taps 1-1, 1-2 and 1-3 of DLB1, DLB2 and DLB3 without crossing over a signal line extended from other matrix switches MTXa2~MTXa8, a signal line extended from the matrix switch MTXa2 can be connected to taps 2-1, 2-2 and 2-3 of DLB1, DLB2 and DLB3 without crossing over a signal line extended from other matrix switches MTXa1 and MTXa3~MTXa8, and a signal line extended from the matrix switch MTXa8 can be connected to taps 8-1, 8-2 and 8-3 of DLB1, DLB2 and DLB3 without crossing over a signal line extended from other matrix switches MTXa1~MTXa7.

An example of connection of matrix switches MTXa and matrix switches MTXb can be the same as shown in FIG. 5. Signal Eout generated from the output Eo of DLB1 is the final output of the delay control circuit.

Figure 15:
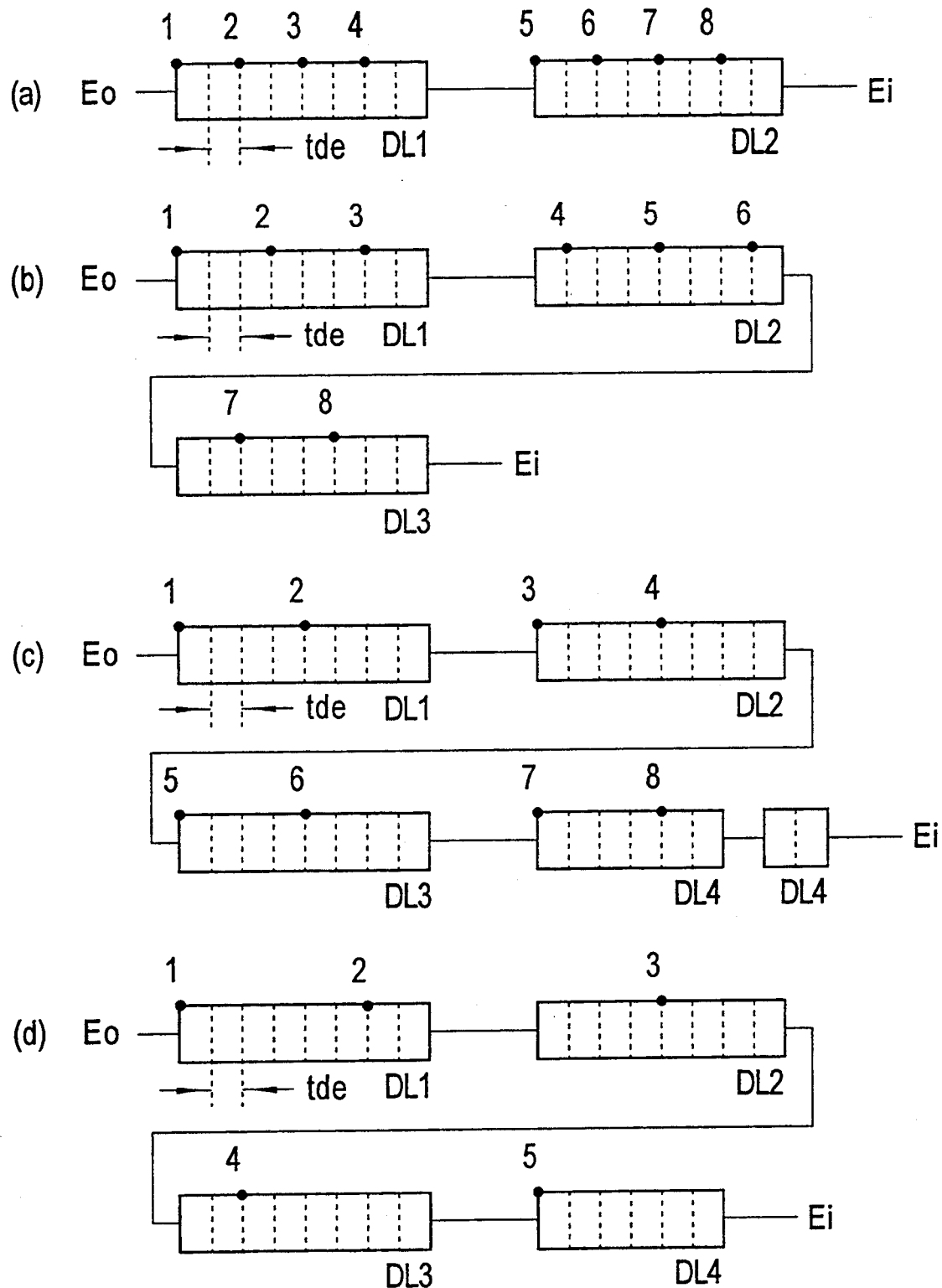
FIG. 15 is a diagram illustrating an example connection of the sub-delay line circuits in the fifth embodiment.

FIG. 15 is an example of connection of the sub-delay line circuits which can be used in the fifth embodiment and illustrates the changeover of input terminals for the probe frequencies at the input side of the sub-delay line circuits.

Judging from the types and control ranges of commercially sold matrix switches, a matrix switch(es) with a suitable number of taps on the delay control blocks can be selected. In case of 12 taps, such construction can be easily realized from the above description. In case eight taps are provided and DL5 is omitted, the above described circuit construction can be realized by the method described above, referring to FIGS. 11~14. In this case, a solution to be found at the sub-delay line circuit is studied.

FIG. 15 (a) shows a connection method of 7.5 MHz probe and the sub-delay line circuit DL12 is formed by coupling DL1 and DL2. In this case, though the sub-delay line circuit DL12 need not be divided into sub-delay line circuits DL1 and DL2, the sub-delay line circuit DL3 described later can have the same delay line circuit as the sub-delay line circuit DL1 if the sub-delay line circuit DL12 is divided as described above. For the 7.5 MHz probe, a tap is provided for each $2 \times tde$ delay amount as shown in FIG. 15 (a) and the delay line with eight taps is provided.

FIG. 15 (b) shows a connection method of the 5.0 MHz probe and the sub-delay line circuits DL1, DL2 and DL3 are used. Sub-delay line circuits DL1 and DL3 can be the same circuit. For the 5.0 MHz probe, a tap is provided for each $2 \times tde$ delay amount and the delay line with eight taps is provided.

FIG. 15 (c) shows a connection method of the 3.5 MHz probe and the sub-delay line circuits DL1, DL2 and DL3 are used. The sub-delay line circuit DL4 is divided into a sub-delay line circuit for $6 \times tde$ delay amount and a sub-delay line circuit for $2 \times tde$ delay amount and, in this case, it is used as a delay line for $(6+2) \times tde$ delay amount. For the 3.5 MHz probe, a tap is provided for each $4 \times tde$ delay amount and the delay line with eight taps is provided.

FIG. 15 (d) shows a connection method of the 2.5 MHz probe and the sub-delay line circuits DL1, DL2 and DL3 are used. The sub-delay line circuit DL4 is divided into a sub-delay line circuit for $6 \times tde$ delay amount and a sub-delay line circuit for $2 \times tde$ delay amount and, in this case, it is used as a delay line for $6 \times tde$ delay amount. For the 2.5 MHz probe, a tap is provided for each $6 \times tde$ delay amount and the delay line with five taps is provided.

Thus the number of taps is reduced for the 2.5 MHz probe but the total amount of delay is only 6% less than for the 3.5 MHz probe and therefore the 2.5 MHz probe with the almost same aperture can be used.

Such configuration of the 2.5 MHz probe for the same fixed number of taps as for the 3.5 MHz probe is not economical because the total amount of delay is 1.5 times larger.

The reason why the sub-delay line circuit DL4 is divided into two sub-delay lines is that serial connection of a plurality of delay lines to a position other than the terminating point will cause large reflection components of signals in the delay line and the characteristics will be substantially deteriorated after the signals have passed a plurality of delay line stages.

Though the terminating resistor and the buffer amplifier are not shown in FIG. 15, at least each sub-delay line shown in FIG. 15 must be terminated. The delay line can be terminated at finer terminating positions than shown in FIG. 15. However, the optimal terminating points are determined in view of the number of additional amplifiers, manufacturing processes of the delay lines and mounting technique.

Figure 16:
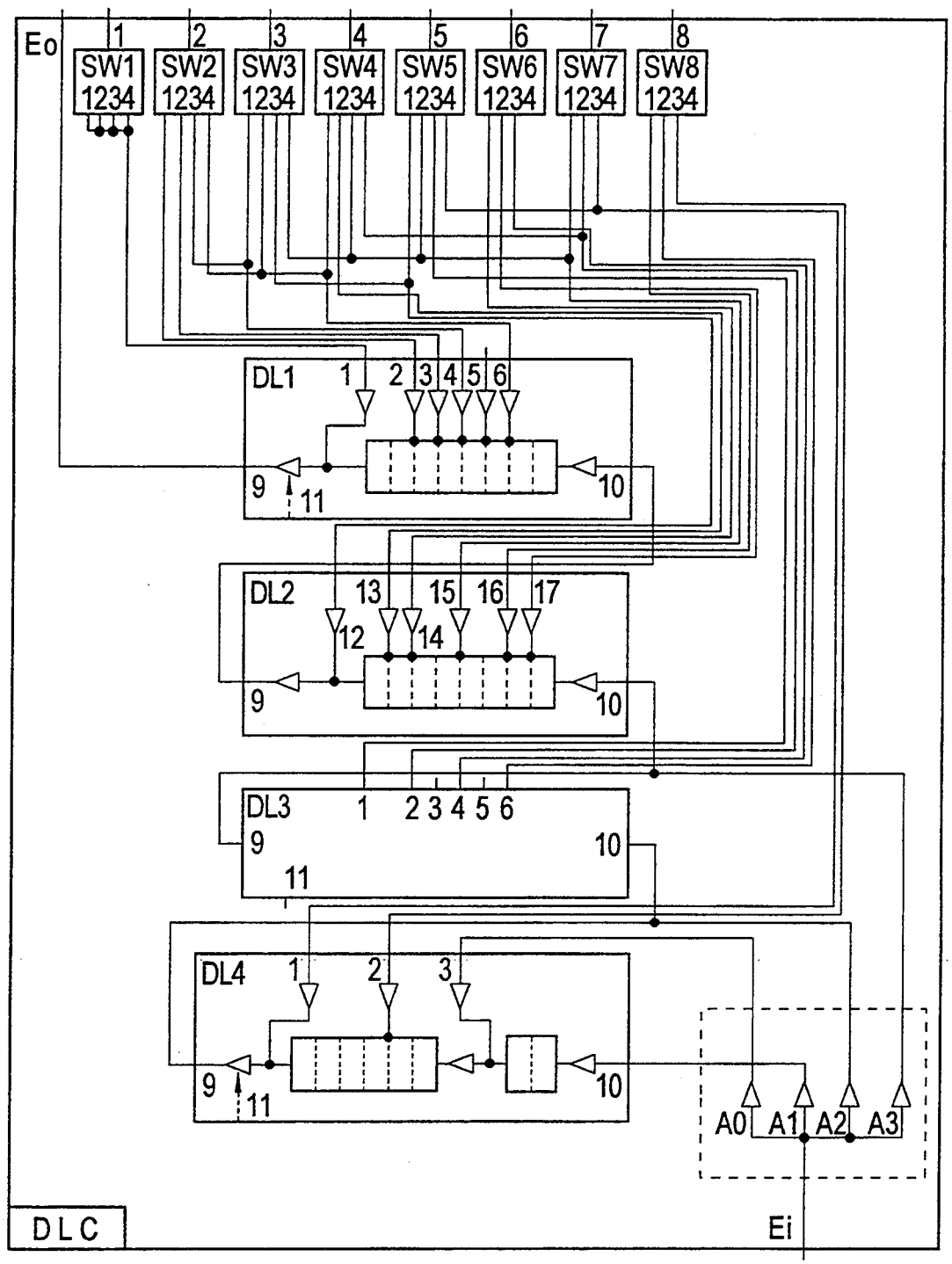
FIG. 16 is a diagram illustrating an example of the delay control block DLC in the fifth embodiment.

FIG. 16 is an illustration of the delay control block DLC used in the fifth embodiment and shows the connection shown in FIG. 15 as a concrete circuit diagram.

The sub-delay line circuit DL12 is formed with two sub-delay line circuits DL1 and DL2 which totally incorporate $2 \times 8$ delay elements for the same amount of delay tde. These sub-delay line circuits DL1 and DL2 differ one from another only in that the signal takeout positions of the intermediate taps (2~6, 13~17) are different, and the sub-delay line circuit DL1 is the same as the sub-delay line circuit DL1 and incorporates eight delay elements for the same amount of delay tde. The sub-delay line circuit DL4 is divided into the sub-delay line for $6 \times tde$ delay amount and the sub-delay line for $2 \times tde$ delay amount.

For the 2.5 MHz probe, the sub-delay line circuits DL1~DL3 to the sub-delay line for $6 \times tde$ of the sub-delay line circuit DL4 can be divided by 5 for each 6×tde delay amount and used as an 5-tap delay line;

for the 3.5 MHz probe, the sub-delay line circuits DL1~DL3 to the sub-delay line for (6+2)×tde of the sub-delay line circuit DL4 can be divided by 8 for each 4×tde delay amount and used as a 8-tap delay line;

for the 5.0 MHz probe, the sub-delay line circuits DL1~DL3 can be divided by 8 for each 3×tde delay amount and used as a 8-tap delay line; and for the 7.5 MHz probe, the sub-delay line circuits DL1 and DL2 can be divided by 8 for each 2×tde delay amount and used as a 8-tap delay line.

In case of such circuit configuration, the ratio of the total amount of delay in the delay control blocks is 3.75:4:3:2 for 2.5 MHz probe vs. 3.5 MHz probe vs. 5.0 MHz probe vs. 7.5 MHz probe and the ratio as to the 3.5 MHz probe to the 7.5 MHz probe is approximately inverse proportional to the probe frequencies and the number of taps is fixed for respective probe frequencies. In addition, for the 2.5 MHz probe, economical advantages can be preferentially taken into account for the circuit configuration. Thus the circuit configuration is adapted, as required, to meet the operating conditions of the ultrasonic diagnostic apparatus.

Actual tap positions on the delay line for the probe frequencies and the external delay tap input terminals 1~8 of the delay control blocks are mated by analog switches SW1~SW8 for one input and four outputs. For example, the output side terminal 1 of each of analog switches SW1~SW8 can be connected to the tap position for the 7.5 MHz probe, the output side terminal 2 can be connected to the tap position for the 5.0 MHz probe, the output side terminal 3 can be connected to the tap position for the 3.5 MHz probe and the output side terminal a can be connected to the tap position for the 2.5 MHz probe.

The direction of connection should be such that the delay amount is reduced at the SW1 side and increased at the SW8 side.

Variations of the ratio of the total amount of delay as 3.75:4:3:2 described above can be satisfied by changing connection of the input Ei of the delay control block and the sub-delay line circuits.

In other words, the connection can be made to:

the terminal 3 of the sub-delay line circuit DL4 through amplifier A0 for the 2.5 MHz probe, the input (right side end of DL4) of the sub-delay line circuit DL4 through amplifier A1 for the 3.5 MHz probe, the input (right side end of DL3) of the sub-delay line circuit DL3 through amplifier A2 For 5.0 MHz probe, and the input (right side end of DL2) of the sub-delay line circuit DL2 through amplifier A3 for 7.5 MHz probe In this case, only those of amplifiers A0~A3 which correspond to the probe frequencies can be kept ON and the others can be kept OFF (high impedance state) or can be kept in a state where only signal components are eliminated at the input side and only the DC components are outputted. Or only one of amplifiers A0~A3 can be selected by using an analog switch.

When the sub-delay line circuit DL3 is not used, the delay line can be controlled so that the circuit from terminal 11 of the sub-delay line circuit DL4 to the final stage amplifier of the DL3 is set to OFF.

The output Eo of the delay control block DLC is extended from the output (left side end of DL1) of the sub-delay line circuit DL1. Input Ei and output Eo of the delay control blocks are the input and output terminals for connecting the delay control blocks to each other, which can be connected with a single signal line.

Figure 17:
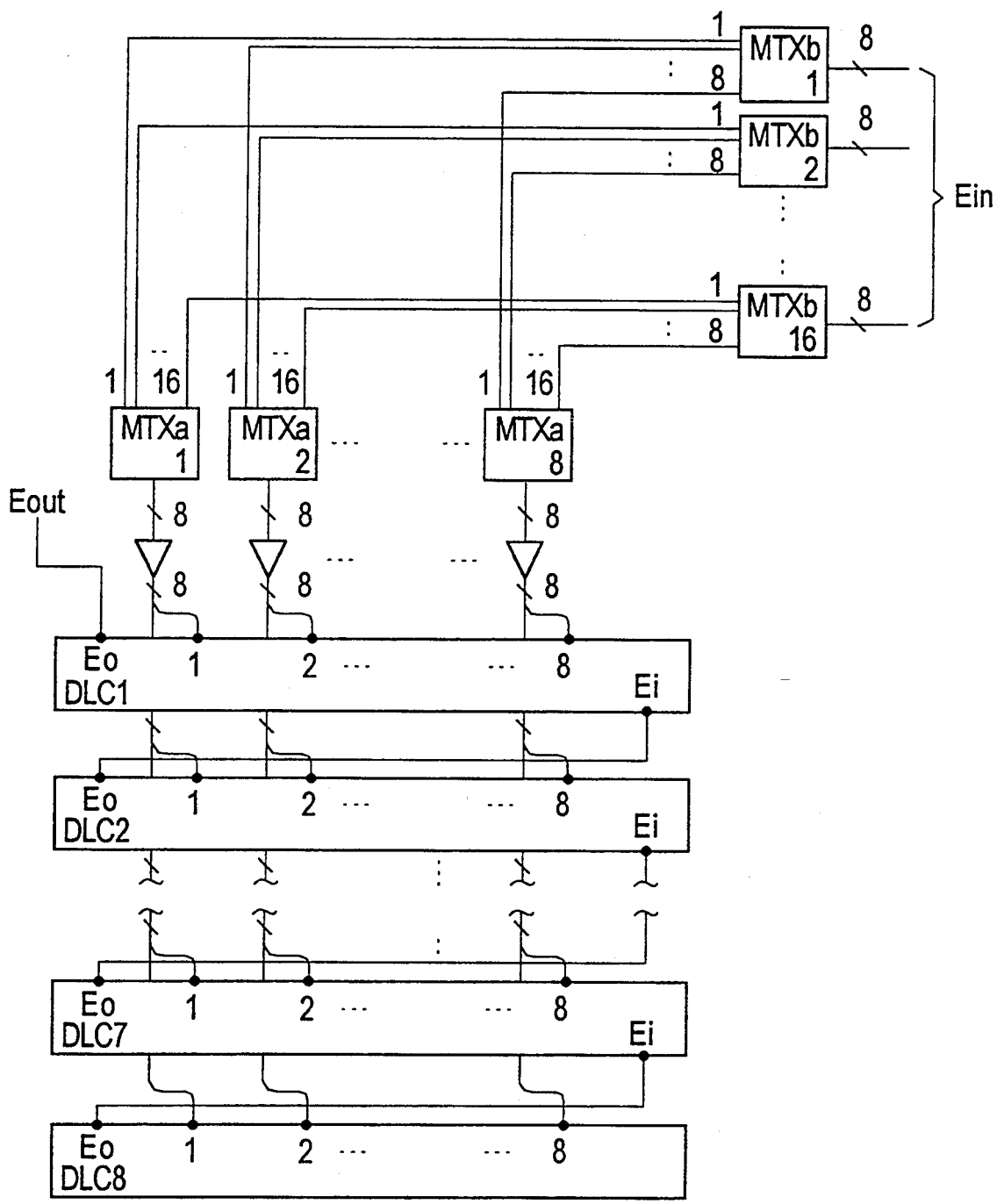
FIG. 17 is a diagram illustrating an example of the delay control circuit in the fifth embodiment.

FIG. 17 shows an example of the delay control circuit consisting of a delay line and analog switches which is used in the fifth embodiment and adapted to allow selection of a group of a fixed number of cyclically continuous taps of the delay line as a set. The number of channels for input Ein depends on the number of all elements of the transducers and, in case of 1:1 connection, the total number of elements is equal to the number of channels. In some cases, the number of signal channels is reduced by adding the signals of two or mope elements in the phase control circuit or the delay control circuit between the Eapo signal and the input Ein; however, the following description does not include a substantial difference and therefore the description in case of 1:1 connection represents other probable descriptions.

Matrix switches MTXb are able to process the signals of eight elements if they are respectively provided with eight inputs. If the total number of elements is 128, sixteen matrix switches MTXb are required. If the maximum difference of delay amount between optional adjacent elements is λ, the delay amount to be controlled of 8λ is required for eight elements and, if the inter-tap delay amount (as much as one tap) of tap terminals 1~8 of the delay control block DLC is λ, the control for 8 taps is required for one matrix switch MTXb. This can be summarized as j=8, k=16 and m=8.

Matrix switch MTXa is a matrix switch with sixteen inputs according to k=16 and the number of output channels is determined according to the total amount of delay required for delay control of the probe. If the total amount of delay is 64λ, eight delay control blocks DLC are required with p=8. However, for the 2.5 MHz probe, the total amount of delay for eight delay control blocks each having five taps is 40λ.

An optional input of an optional matrix switch MTXb, which is particularly noted, allows for selection of an optional matrix switch MTXa. An optional delay control block DLC can be selected by the matrix switch MTXa. Thus an optional input of an optional matrix switch MTXb allows for selection an optional tap on the delay control blocks DLC1~DLC8.

The matrix switch MTXa can cyclically select a group of continuous taps on the delay control block DLC (for example, taps 1, 2, ..., 8 on DLC1; taps 3, 4, ..., 8 on DLC1; and taps 1, 2 on DLC2; ...; tap 8 on DLC7 and taps 1, 2, ..., 7 on DLC8; and taps 1, 2, 3, ..., 8 on DLC8) as a set. For the 2.5 MHz probe, taps 1~5 on the delay control block DLC are cyclically selected.

In case of such circuit construction, a signal line extended from the matrix switch MTXa1 can be connected to tap 1 of DLC1, DLC2, ..., DLC8 without crossing over a signal line extended from other matrix switches MTXa2~MTXa8, a signal line extended from the matrix switch MTXa2 can be connected to tap 2 of DLC1, DLC2, ..., DLC8 without crossing over a signal line extended from other matrix switches MTXa1 and MTXa3~MTXa8, and a signal line extended from the matrix switch MTXa8 can be connected to tap 8 of DLC1, DLC2, ..., DLC8 without crossing over a signal line extended from other matrix switches MTXa1~MTXa7.

An example of connection of matrix switches MTXa and matrix switches MTXb can be the same as shown in FIG. 5.

Signal Eout generated from the output Eo of DLC1 is the final output of the delay control circuit.

I claim:

1. An ultrasonic diagnostic apparatus for use with a subject, comprising:
   an ultrasonic probe including a plurality of ultrasonic transducers arranged in a predetermined arrangement, for generating and transmitting ultrasonic waves into the subject, receiving the ultrasonic waves reflected in the subject, and generating signals from respective ultrasonic transducers, based on the reflected ultrasonic waves;
   a delay control circuit coupled to said ultrasonic probe, for performing at least one of delay time control and phase control on the signals, to generate a display of the subject, said delay control circuit including
   a delay line including a predetermined number of delay control blocks coupled in series using at least one of external input and external output terminals of each of the delay control blocks, the delay control blocks including sub-delay line circuits with at least one of internal input and internal output terminals coupling the sub-delay line circuits in series, each sub-delay line circuit including a plurality of series-coupled delay elements and a plurality of delay taps coupled to respective points between or at first and second ends of the series-coupled delay elements, the first and second ends being coupled to the internal input and internal output terminals, respectively, and each of the delay elements providing a predetermined unit amount of delay, and
   a plurality of matrix switches coupled to the delay taps and to receive the signals, to select a group of cyclically adjacent delay taps, said group being determined based on a frequency of said ultrasonic probe, to delay said signals by respective predetermined amounts of delay based on the group selected.

2. An ultrasonic diagnostic apparatus in accordance with claim 1, wherein the sub-delay line circuits of each of said delay control blocks, include a first sub-delay line circuit having 2m sets of delay elements, a second sub-delay line circuit having m sets of delay elements, a third sub-delay line circuit having m sets of delay elements and a fourth sub-delay line circuit having 2m sets of delay elements, the predetermined unit amount of delay being tde, said first, second, third and fourth sub-delay line circuits being coupled in series, and
   the first, second, third and fourth sub-delay line circuits being used as the delay line with m delay taps, which is divided by m for each delay amount $6 \times tde$ if the frequency of said ultrasonic waves is 2.5 MHz,
   the first, second and third sub-delay line circuits being used as the delay line with m delay taps, which is divided by m for each delay amount $4 \times tde$ if the frequency of said ultrasonic waves is 3.5 MHz,
   the first and second sub-delay line circuits being used as the delay line with m delay taps, which is divided by m for each delay amount $3 \times tde$ if the frequency of said ultrasonic waves is 5.0 MHz, and the first sub-delay line circuit being used as the delay line with m delay taps, which is divided by m for each delay amount $2 \times tde$ if the frequency of said ultrasonic waves is 7.5 MHz.

3. An ultrasonic diagnostic apparatus as claimed in claim 2, wherein the first, second, third and fourth sub-delay line circuits are coupled in order from the respective external input terminals of the delay control blocks.

4. An ultrasonic diagnostic apparatus as claimed in claim 2, wherein the first, second, third and fourth sub-delay circuits are coupled in order from the respective external output terminals of the delay control blocks.

5. An ultrasonic diagnostic apparatus in accordance with claim 1, wherein the sub-delay line circuits of each of said delay control blocks, includes a first sub-delay line circuit having 2m sets of delay elements, a second sub-delay line circuit having m sets of delay elements and a third sub-delay line circuit having m delay elements, m being a 3's multiple, the predetermined unit amount of delay being tde, said first, second and third sub-delay line circuits being coupled in series, and
   the first, second and third sub-delay line circuits being used as the delay line with 2m/3 delay taps, which is divided by 2m/3 for each delay amount $6 \times tde$ if the frequency of said ultrasonic waves is 2.5 MHz,
   the first, second and third sub-delay line circuits being used as the delay line with m delay taps, which is divided by m for each delay amount $4 \times tde$ if the frequency of said ultrasonic waves is 3.5 MHz,
   the first and second sub-delay line circuits being used as the delay line with m delay taps, which is divided by m for each delay amount $3 \times tde$ if the frequency of said utlrasonic waves is 5.0 MHz, and
   the first sub-delay line circuit being used as the delay line with m delay taps, which is divided by m for each delay amount $2 \times tde$ if the frequency of said ultrasonic waves is 7.5 MHz.

6. An ultrasonic diagnostic apparatus in accordance with claim 5, wherein said first sub-delay line circuit includes a 1-1 sub-delay line circuit and a 1-2 sub-delay line circuit coupled in series, and said 1-1 sub-delay line circuit, said 1-2 sub-delay line circuit, said second sub-delay line circuit and said third sub-delay line circuit respectively include m sets of delay elements, m being a 12's multiple.

7. An ultrasonic diagnostic apparatus in accordance with claim 6, wherein said plurality of delay control blocks includes two delay control blocks each being provided with said 1-1 sub-delay line circuit, said 1-2 sub-delay line circuit, said second sub-delay line circuit and said third sub-delay line circuit, which respectively include m sets of delay elements and have 24's integer multiple delay taps, m being an odd 12's multiple.

8. An ultrasonic diagnostic apparatus as claimed in claim 5, wherein the first, second and third sub-delay line circuits are coupled in order from the respective external input terminals of the delay control blocks.

9. An utlrasonic diagnostic apparatus as claimed in claim 5, wherein the first, second, third and fourth sub-delay circuits are coupled in order from the respective external output terminals of the delay control blocks.

10. An ultrasonic diagnostic apparatus in accordance with claim 1, wherein the sub-delay line circuits of each of said delay control blocks, include a first sub-delay line circuit having sixteen delay elements, a second sub-delay line circuit having eight delay elements, a third sub-delay line circuit having six delay elements and a fourth sub-delay line circuit having two delay elements, the first, second, third and fourth sub-delay line circuits being coupled in series said first, second and third sub-delay line circuits being used as the delay line with five delay taps, which is divided by 5 for each delay amount $6 \times tde$ if the frequency of said ultrasonic waves is 2.5 MHz, said first, second, third and fourth sub-delay line circuits being used as the delay line with eight delay taps, which is divided by 8 for each delay amount $4 \times tde$ if the frequency of said ultrasonic waves is 3.5 MHz, said first and second sub-delay line circuits being used as the delay line with eight delay taps, which is divided by 8 for each delay amount $3 \times tde$ if the frequency of said ultrasonic waves is 5.0 MHz, and said first sub-delay line circuit being used as the delay line with eight delay taps, which is divided by 8 for each delay amount $2 \times tde$ if the frequency of said ultrasonic waves is 7.5 MHz.

11. An utlrasonic diagnostic apparatus as claimed in claim 10, wherein the first, second third and fourth sub-delay line circuits are coupled in order from the respective external input terminals of the delay control blocks.

12. An utlrasonic diagnostic apparatus as claimed in claim 10, wherein the first, second, third and fourth sub-delay line circuits are coupled in order from the respective external output terminals of the delay control blocks.

13. An ultrasonic diagnostic apparatus as claimed in claim 1, wherein a total number of signals is equal to an integer multiple of a number of the cyclically adjacent delay taps.

14. An ultrasonic diagnostic apparatus as claimed in claim 1, wherein each of the delay elements has a predetermined length of resistive material.

15. An utlrasonic diagnostic apparatus as claimed in claim 1, wherein at least one of the delay control blocks includes a selector coupled between the external input terminal and the sub-delay line circuits of the at least one of the delay control blocks, to selectively coupled one of the sub-delay line circuits to the external input terminal, based on the frequency of the ultrasonic waves.

16. An ultrasonic diagnostic apparatus as claimed in claim 1, wherein at least one of the delay control blocks includes a selector coupled between the external output terminal and the sub-delay line circuits of the at least one of the delay control blocks, to selectively couple one of the sub-delay line circuits to the external output terminal, based on the frequency of the ultrasonic waves.

17. An apparatus receiving a signal, comprising:

a plurality of delay elements coupled in series, each of the delay elements capable of delaying the signal by a predetermined unit time delay $t_{de}$; and at least one switch coupled to the delay elements, and capable of selectively coupling based on a frequency of the signal, the signal to different connection points along the delay elements to delay the signal by $i \times t_{de}$, i being an integer determined by the selective coupling, to generate a delayed signal based on the signal.

18. An apparatus as claimed in claim 17, wherein the apparatus receives a plurality of signals selectively coupled to the different connection points by the at least one switch, based on the frequency of the signals, to delay the signals at delay intervals of $i \times t_{de}$, to generate delayed signals.

19. An apparatus as claimed in claim 18, wherein the apparatus receives an external delayed signal, the apparatus further comprising:

a selector for selectively coupling the external delayed signal to one of the first and second sub-delay line circuits, based on the frequency of the signals.

20. An apparatus as claimed in claim 18, wherein the delayed signals are output externally from the apparatus.

21. An apparatus receiving a plurality of signals, comprising:

a first sub-delay line circuit including a first plurality of delay elements coupled in series, each of the delay elements capable of delaying the signal by a predetermined unit time delay $t_{de}$;

a second sub-delay line circuit including a second plurality of delay elements coupled in series, the second plurality of delay elements being coupled in series to the first plurality of delay elements; and a plurality of switches coupled to receive respective signals, and capable of selectively coupling based on a frequency of the signal, the signal to different connection points along the first plurality of delay elements and along the second plurality of delay elements so that the signals are delayed by time intervals of $i \times t_{de}$, i being an integer determined by the selective coupling, to generate delayed signals based on the signals.

\* \* \* \* \*

UNITED STATES PATENT AND TRADEMARK OFFICE
CERTIFICATE OF CORRECTION

PATENT NO. : 5,343,864
DATED : September 6, 1994
INVENTOR(S) : SUGIYAMA

It is certified that error appears in the above-indentified patent and that said Letters Patent is hereby corrected as shown below:

Col. 2, line 48, after "series" insert --to--.

Col. 16, line 31, after "3,..." insert --,--.

Col. 19, line 17, "to select" s/b --for selection of--.

Col. 20, line 61, "DL1" s/b --DL3--.

Col. 21, line 37, "a" s/b --4--.

Col. 22, line 47, after "selection" insert --of--.

Signed and Sealed this

Twenty-seventh Day of December, 1994

Attest:

BRUCE LEHMAN

Attesting Officer    Commissioner of Patents and Trademarks